US008216870B2

(12) United States Patent
Morii

(10) Patent No.: US 8,216,870 B2
(45) Date of Patent: Jul. 10, 2012

(54) MECHANICAL QUANTITY SENSOR AND METHOD OF MANUFACTURING THE SAME

(75) Inventor: Akio Morii, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 356 days.

(21) Appl. No.: 12/520,343

(22) PCT Filed: Dec. 26, 2007

(86) PCT No.: PCT/JP2007/074938
§ 371 (c)(1),
(2), (4) Date: Jun. 19, 2009

(87) PCT Pub. No.: WO2008/078770
PCT Pub. Date: Jul. 3, 2008

(65) Prior Publication Data
US 2010/0083755 A1    Apr. 8, 2010

(30) Foreign Application Priority Data
Dec. 27, 2006  (JP) ................. P2006-352488

(51) Int. Cl.
*H01L 21/00* (2006.01)
(52) U.S. Cl. ..................... 438/50; 73/504.12
(58) Field of Classification Search ............. 73/504.12, 73/514.29; 438/50; 257/E21.211, 415, 419
See application file for complete search history.

(56) References Cited

U.S. PATENT DOCUMENTS
5,233,213 A * 8/1993 Marek ................... 257/415
(Continued)

FOREIGN PATENT DOCUMENTS
EP  1491901 A1  12/2004
(Continued)

OTHER PUBLICATIONS
International Search Report issued by Japanese Patent Office in International Application No. PCT/JP2007/074938, on Dec. 26, 2007.
(Continued)

*Primary Examiner* — Hezron E Williams
*Assistant Examiner* — Samir M Shah
(74) *Attorney, Agent, or Firm* — Finnegan, Henderson, Farabow, Garrett & Dunner, L.L.P.

(57) ABSTRACT

A mechanical quantity sensor includes: a first structure having a fixed portion with an opening, a displaceable portion disposed in the opening and displaceable relative to the fixed portion, and a connection portion connecting the fixed portion and the displaceable portion to each other; a second structure having a weight portion joined to the displaceable portion and a pedestal joined to the fixed portion, the second structure being stacked on the first structure; a first base having a first driving electrode which is disposed on a surface facing the displaceable portion and is made of a conductive material containing Al and Nd, the first base being stacked on the first structure while being connected to the fixed portion; and a second base having a second driving electrode which is disposed on a surface facing the weight portion and is made of the conductive material, the second base being stacked on the second structure while being connected to the pedestal.

5 Claims, 11 Drawing Sheets

U.S. PATENT DOCUMENTS

| | | | |
|---|---|---|---|
| 5,461,916 A * | 10/1995 | Fujii et al. | 73/514.32 |
| 5,627,318 A * | 5/1997 | Fujii et al. | 73/514.32 |
| 5,872,024 A * | 2/1999 | Fujii et al. | 438/52 |
| 6,055,858 A | 5/2000 | Muenzel et al. | 73/504.12 |
| 6,227,050 B1 * | 5/2001 | Fujii et al. | 73/514.32 |
| 6,400,009 B1 * | 6/2002 | Bishop et al. | 257/704 |
| 6,450,031 B1 * | 9/2002 | Sakai et al. | 73/514.16 |
| 6,463,803 B2 * | 10/2002 | Fujii et al. | 73/514.32 |
| 6,973,829 B2 * | 12/2005 | Sakai et al. | 73/514.32 |
| 7,040,165 B2 * | 5/2006 | Fujii et al. | 73/514.32 |
| 7,132,722 B2 * | 11/2006 | Ohashi | 257/415 |
| 7,178,400 B2 * | 2/2007 | Murata et al. | 73/514.29 |
| 7,188,524 B2 * | 3/2007 | Nishida et al. | 73/504.13 |
| 7,294,895 B2 | 11/2007 | Yarita et al. | |
| 7,337,670 B2 * | 3/2008 | Murata et al. | 73/514.16 |
| 7,394,138 B2 * | 7/2008 | Katou et al. | 257/414 |
| 7,407,827 B2 * | 8/2008 | Fujii et al. | 438/52 |
| 7,540,191 B2 * | 6/2009 | Hashimoto et al. | 73/514.29 |
| 7,608,900 B2 * | 10/2009 | Tasaki | 257/417 |
| 7,658,109 B2 * | 2/2010 | Fukuda et al. | 73/514.32 |
| 7,685,877 B2 * | 3/2010 | Fujii et al. | 73/514.32 |
| 7,736,985 B2 * | 6/2010 | Enomoto et al. | 438/393 |
| 7,754,595 B2 * | 7/2010 | Enomoto et al. | 438/597 |
| 7,838,951 B2 * | 11/2010 | Kimino | 257/414 |
| 7,859,091 B2 * | 12/2010 | Fujii et al. | 257/684 |
| 7,866,210 B2 * | 1/2011 | Fujii et al. | 73/514.32 |
| 8,022,433 B2 * | 9/2011 | Aono et al. | 257/99 |
| 2004/0263186 A1 | 12/2004 | Yarita et al. | |
| 2005/0000285 A1 * | 1/2005 | Nishida et al. | 73/504.12 |
| 2005/0194651 A1 * | 9/2005 | Ohashi | 257/415 |
| 2005/0202594 A1 | 9/2005 | Geosling | |
| 2005/0229704 A1 * | 10/2005 | Murata et al. | 73/514.16 |
| 2005/0253283 A1 * | 11/2005 | DCamp et al. | 257/787 |
| 2006/0266862 A1 * | 11/2006 | Hashimoto et al. | 242/343.2 |
| 2007/0120205 A1 * | 5/2007 | Murata et al. | 257/414 |
| 2010/0077859 A1 * | 4/2010 | Takeshita et al. | 73/504.12 |
| 2010/0089156 A1 * | 4/2010 | Morii | 73/504.12 |
| 2010/0139400 A1 * | 6/2010 | Morii | 73/504.12 |

FOREIGN PATENT DOCUMENTS

| | | |
|---|---|---|
| EP | 1 521 274 A1 | 4/2005 |
| JP | 8-304450 | 11/1996 |
| JP | 10-084119 | 3/1998 |
| JP | 10-213441 | 8/1998 |
| JP | 2002-350138 | 12/2002 |
| JP | 2004-12326 | 1/2004 |
| JP | 2004-144598 | 5/2004 |
| JP | 2004-361394 | 12/2004 |
| JP | 2006-053125 | 2/2006 |
| JP | 2006-329885 | 12/2006 |
| JP | 2006-344573 | 12/2006 |
| WO | WO 2004/003936 A1 | 1/2004 |

OTHER PUBLICATIONS

International Preliminary Report on Patentability and Written Opinion issued by the International Bureau of WIPO on Jun. 30, 2009, for International Application No. PCT/JP2007/074938.

Japanese Office Action, issued by Japanese Patent Office, mailed Jan. 10, 2012, in Japanese Patent Application No. 2008-551132 (5 pages including English language translation).

Extended European Search Report, issued by European Patent Office, mailed Feb. 1, 2012, in European Patent Application No. 07860167.1 (7 pages).

* cited by examiner

MECHANICAL QUANTITY SENSOR AND METHOD OF MANUFACTURING THE SAME

CROSS REFERENCE TO RELATED APPLICATIONS

This application is a National Phase application based on PCT/JP2007/074938 filed on Dec. 26, 2007, the content of which is incorporated herein by reference.

TECHNICAL FIELD

The present invention relates to a mechanical quantity sensor detecting a mechanical quantity, and to a method of manufacturing the same.

BACKGROUND ART

There has been disclosed a technique of an angular velocity sensor detecting an angular velocity, in which a transducer structure made of a semiconductor is joined to a glass substrate (see patent reference 1).
Patent reference 1: JP-A 2002-350138 (KOKAI)

DISCLOSURE OF THE INVENTION

However, if driving electrodes which apply stack-direction vibration to a weight portion are made of Al, hillocks (for example, semispherical protuberances) are sometimes generated in the driving electrodes when the transducer structure and the glass substrate are anodically bonded. It has been found out that hillocks, if generated in the driving electrodes, lower dimension precision between the capacitively coupled driving electrodes and thus cause a difference in capacitance value, which may cause variation in characteristic among products. It has been further found out that, if hillocks are generated in the driving electrodes, the two driving electrodes which are to be capacitively coupled come into contact with each other via the hillocks to be short-circuited when the weight portion is vibrated in the stack direction by the driving electrodes.

Considering the above circumstances, it is an object of the present invention to provide a mechanical quantity sensor realizing a reduction in characteristic variation among products and capable of preventing its driving electrodes which are to be capacitively coupled from coming into contact with each other to be short-circuited, and to provide a method of manufacturing the same.

A mechanical quantity sensor according to an aspect of the present invention includes: a first structure having a fixed portion with an opening, a displaceable portion disposed in the opening and displaceable relative to the fixed portion, and a connection portion connecting the fixed portion and the displaceable portion to each other, the first structure being made of a first semiconductor material in a flat plate shape; a second structure having a weight portion which is joined to the displaceable portion and a pedestal which surrounds the weight portion and is joined to the fixed portion, the second structure being made of a second semiconductor material and being stacked on the first structure; a first base having a first driving electrode which applies stack-direction vibration to the displaceable portion, is disposed on a surface facing the displaceable portion, and is made of a conductive material containing Al and Nd, the first base being made of an insulating material and being stacked on the first structure while being connected to the fixed portion; and a second base having a second driving electrode which applies stack-direction vibration to the displaceable portion, is disposed on a surface facing the weight portion, and is made of the conductive material, the second base being made of an insulating material and being stacked on the second structure while being connected to the pedestal.

A method of manufacturing a mechanical quantity sensor according to an aspect of the present invention includes: forming a first structure having a fixed portion with an opening, a displaceable portion disposed in the opening and displaceable relative to the fixed portion, and a connection portion connecting the fixed portion and the displaceable portion to each other, by etching a first layer of a semiconductor substrate in which the first layer made of a first semiconductor material, a second layer made of an insulating material, and a third layer made of a second semiconductor material are stacked in order; stacking, on the first structure, a first base by joining the first base to the fixed portion, the first base having a first driving electrode which applies stack-direction vibration to the displaceable portion, is disposed on a surface facing the displaceable portion, and is made of a conductive material containing Al and Nd, and the first base being made of an insulating material; forming a second structure by etching the third layer, the second structure having a weight portion which is joined to the displaceable portion and a pedestal which surrounds the weight portion and is joined to the fixed portion; and stacking, on the second structure, a second base by joining the second base to the pedestal, the second base having a second driving electrode which applies stack-direction vibration to the displaceable portion, is disposed on a surface facing the weight portion, and is made of the conducive material, and the second base being made of an insulating material, wherein anodic bonding is used in at least one of the stacking the first base on the first structure and the stacking the second base on the second structure.

EXPLANATION OF Numerals

100 . . . mechanical quantity sensor, 110 . . . first structure, 111 . . . fixed portion, 111a . . . frame portion, 111b, 111c . . . projecting portion, 112 (112a-112e) . . . displaceable portion, 113 (113a-113d) . . . connection portion, 114 (114a-114j) . . . block upper layer portion, 115 (115a-115d) . . . opening, 120, 121, 122, 123 . . . joining part, 130 . . . second structure, 131 . . . pedestal, 131a . . . frame portion, 131b~131d . . . projecting portion, 132 (132a-133e) . . . weight portion, 133 . . . opening, 134 (134a-134j) . . . block lower layer portion, 135 . . . pocket 140 . . . first base, 141 . . . frame portion, 142 . . . bottom plate portion 143 . . . recessed portion, 144a . . . driving electrode, 144b-144e . . . detection electrode, 150 . . . second base, 154a . . . driving electrode, 154b-154e . . . detection electrode, 160-162 . . . conduction portion, 10 . . . gap, 11 . . . conical through hole, L1, L2, L4-L11 . . . wiring layer, T1-T11 . . . wiring terminal, E1 . . . driving electrode, detection electrode

BEST MODE FOR CARRYING OUT THE INVENTION

Hereinafter, an embodiment of the present invention will be described in detail with reference to the drawings.

First Embodiment

Figure 1:
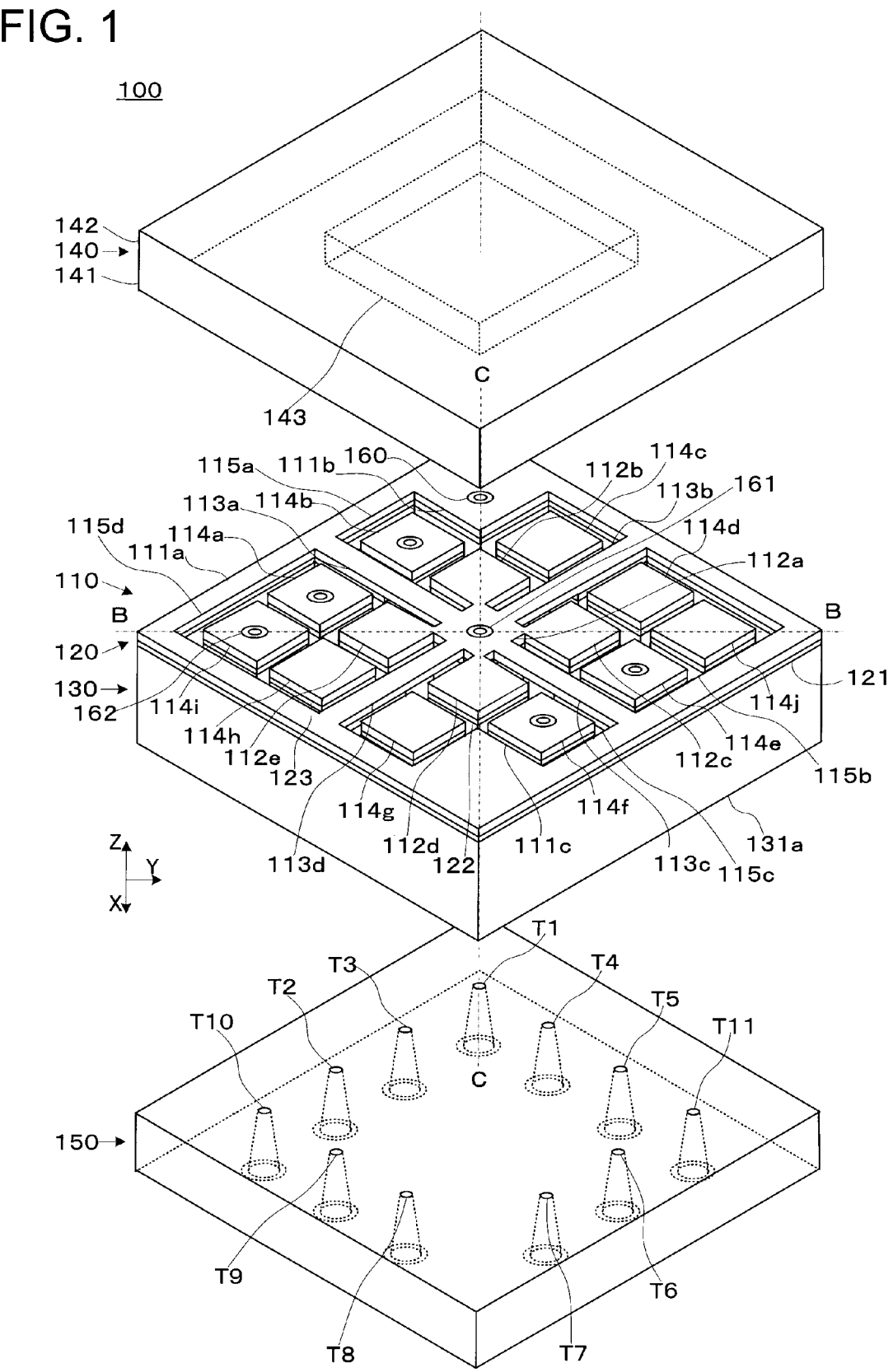
FIG. 1 is an exploded perspective view showing a state where a mechanical quantity sensor according to a first embodiment of the present invention is disassembled.
Figure 2:
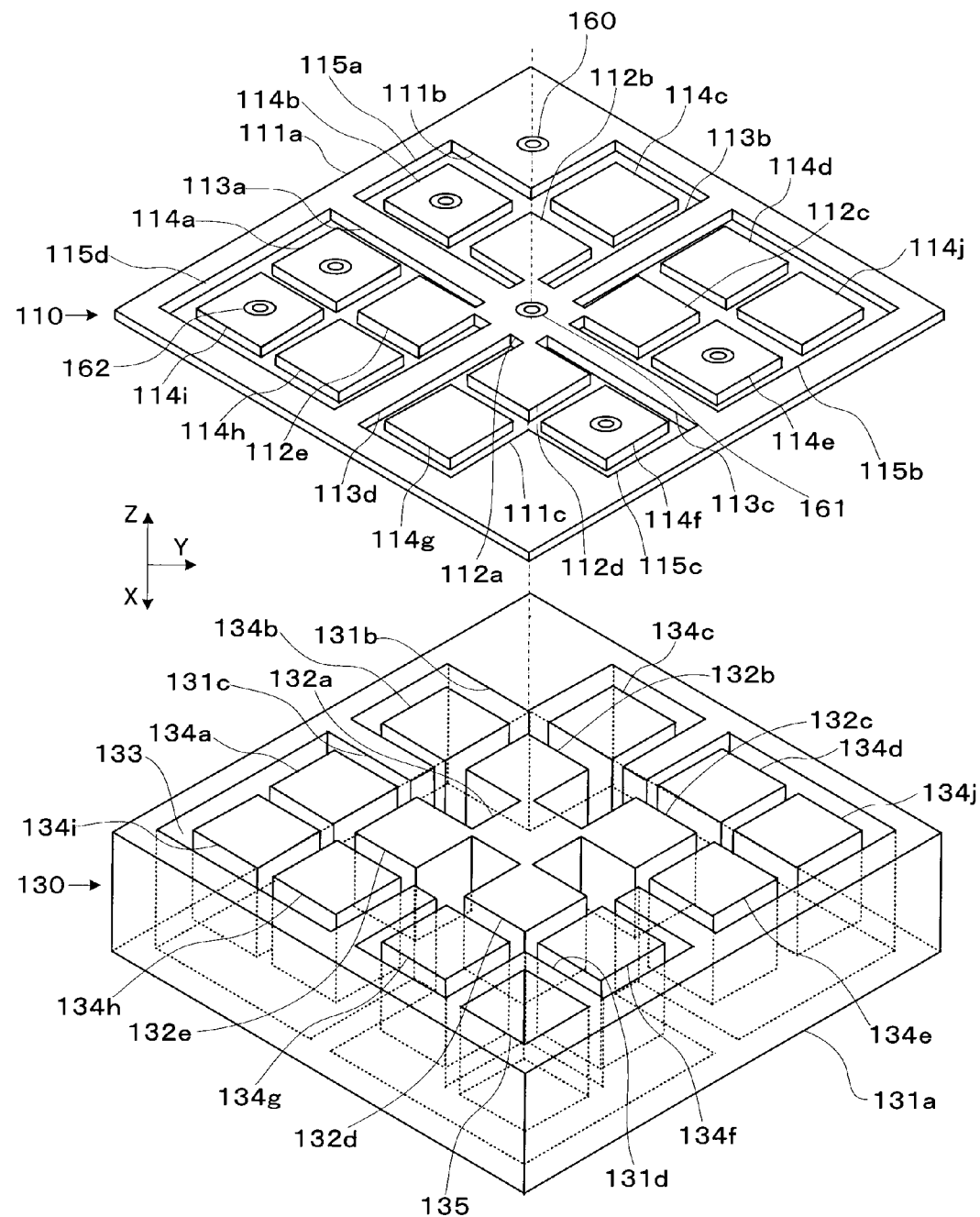
FIG. 2 is an exploded perspective view showing the state where the mechanical quantity sensor in FIG. 1 is disassembled.
Figure 3:
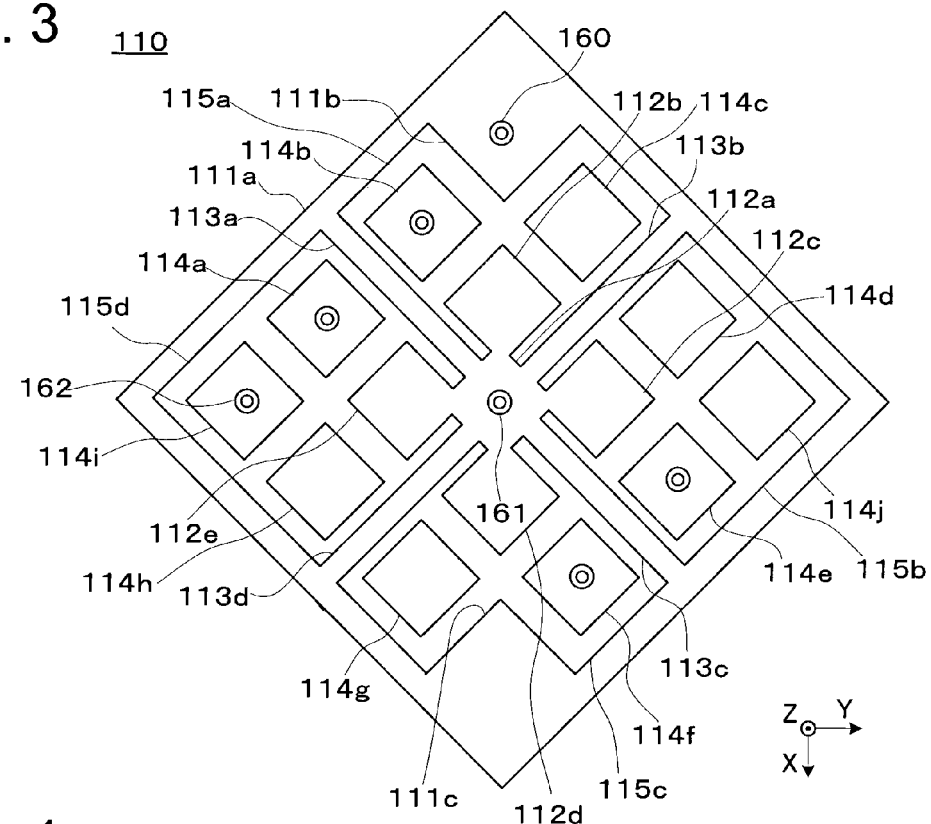
FIG. 3 is a top view of a first structure.
Figure 4:
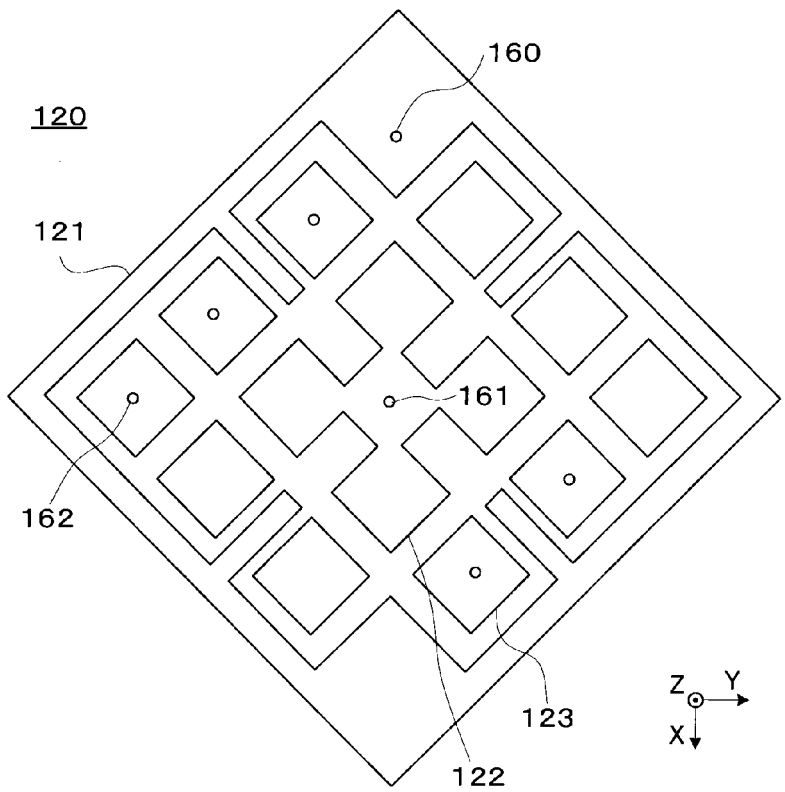
FIG. 4 is a top view of a joining part.
Figure 5:
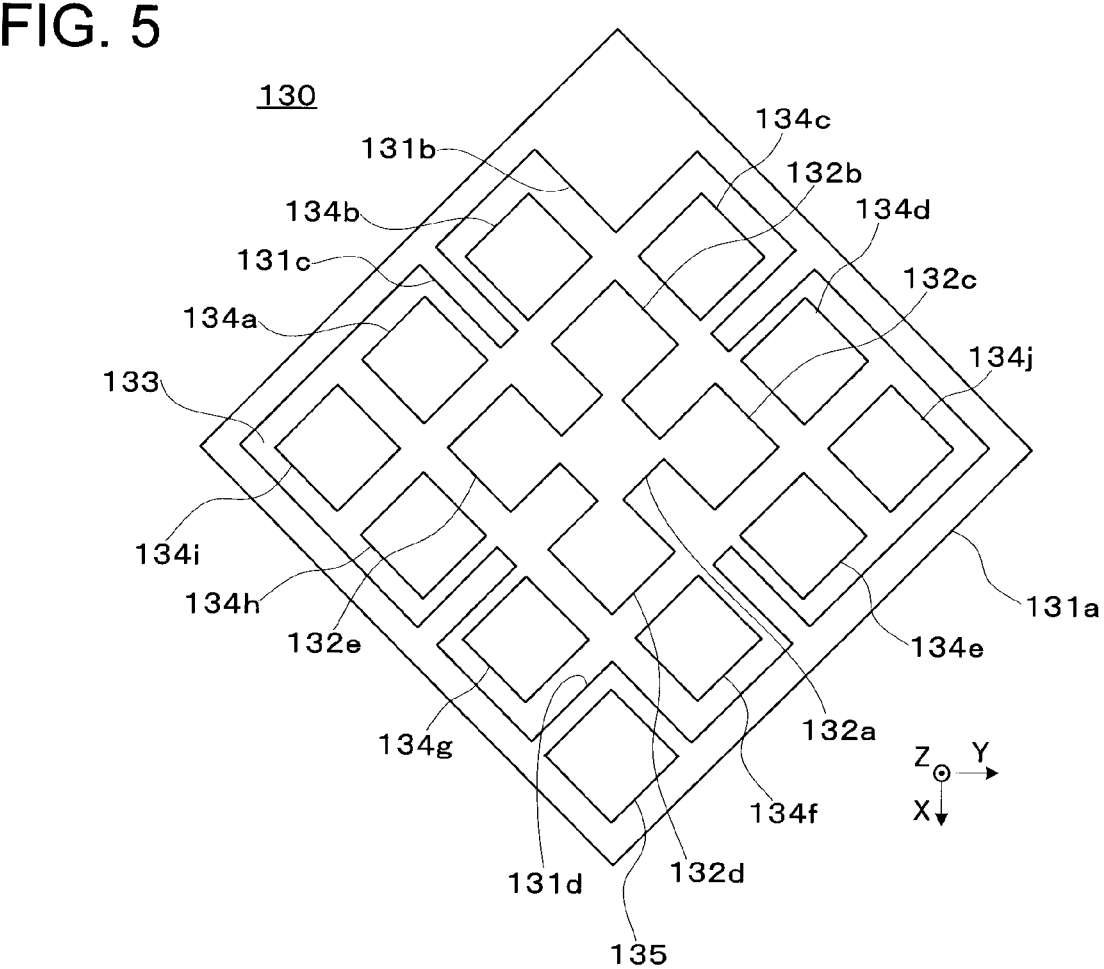
FIG. 5 is a top view of a second structure.
Figure 6:
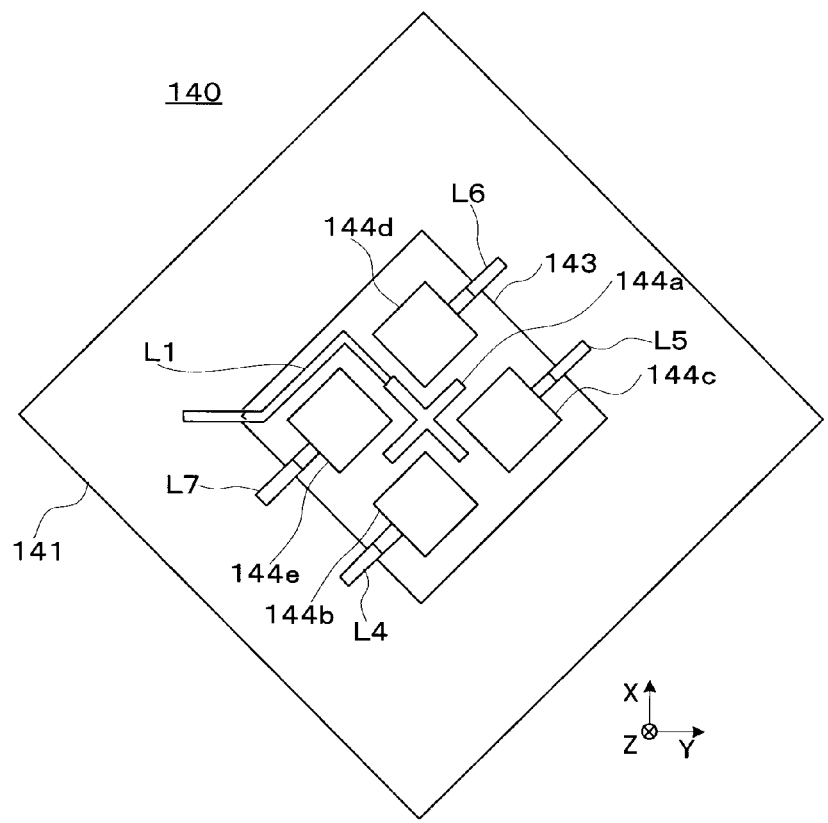
FIG. 6 is a bottom view of a first base.
Figure 7:
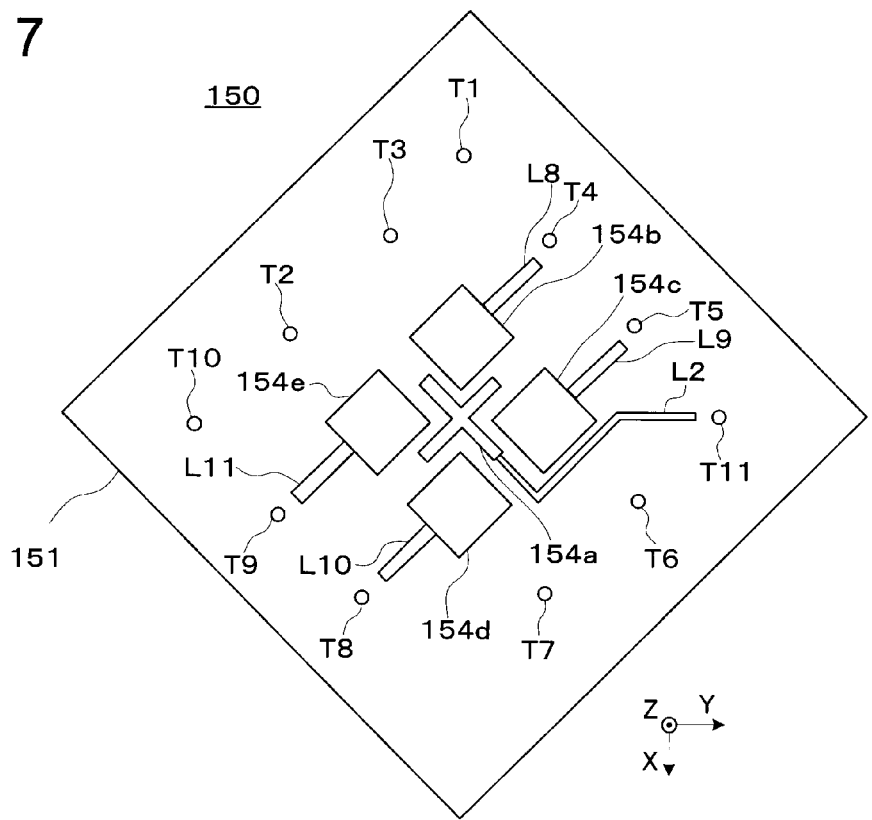
FIG. 7 is a top view of a second base.
Figure 8:
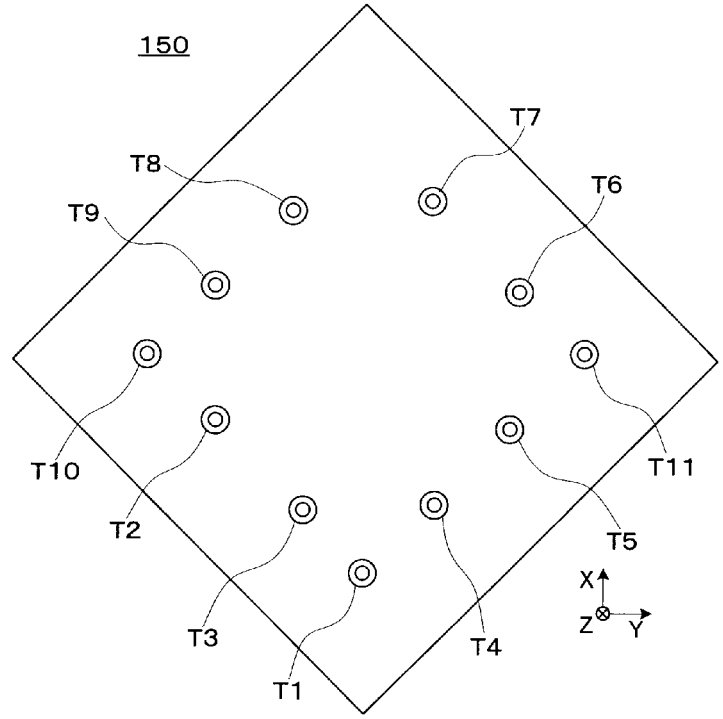
FIG. 8 is a bottom view of the second base.
Figure 9:
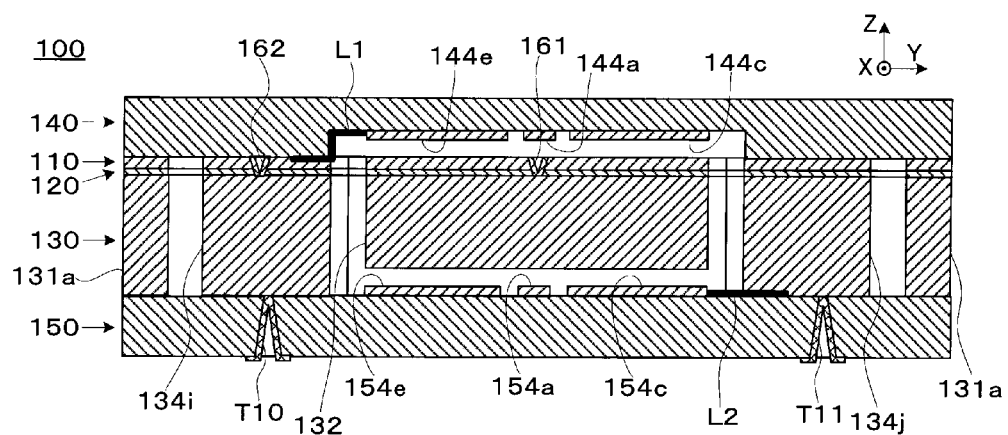
FIG. 9 is a cross-sectional view taken along B-B in FIG. 1.
Figure 10:
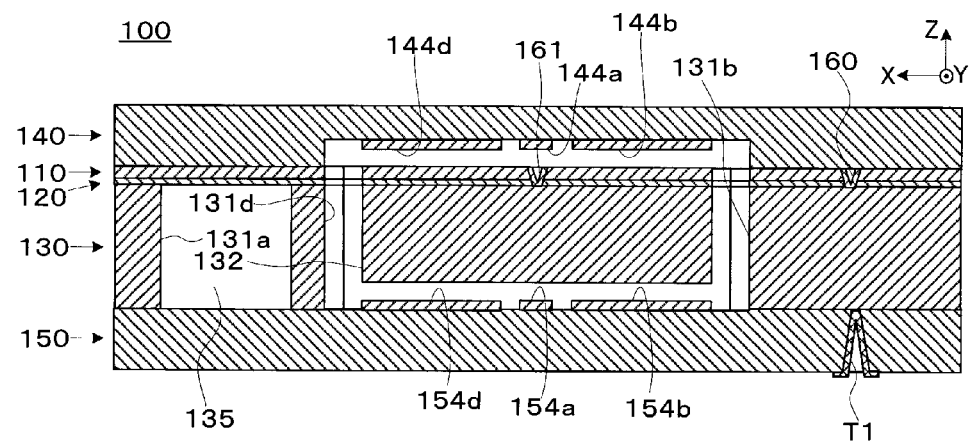
FIG. 10 is a cross-sectional view taken along C-C in FIG. 1.

FIG. 1 is an exploded perspective view showing a state where a mechanical quantity sensor 100 is disassembled. The mechanical quantity sensor 100 has a first structure 110, a joining part 120, and a second structure 130 which are stacked on one another, a first base 140, and a second base 150. FIG. 2 is an exploded perspective view showing a state where part of the mechanical quantity sensor 100 (the first structure 110 and the second structure 130) is further disassembled. FIG. 3, FIG. 4, and FIG. 5 are top views of the first structure 110, the joining part 120, and the second structure 130 respectively. FIG. 6, FIG. 7, and FIG. 8 are a bottom view of the first base 140, a top view of the second base 150, and a bottom view of the second base 150 respectively. FIG. 9 and FIG. 10 are cross-sectional views of the mechanical quantity sensor 100 taken along B-B and C-C in FIG. 1 respectively.

The mechanical quantity sensor 100 in a stand-alone state or in combination with a circuit board (for example, mounted on a board) functions as an electronic component. The mechanical quantity sensor 100 as the electronic component is mountable on a game machine, a mobile terminal (for example, a mobile phone), and the like. The mechanical quantity sensor 100 and the circuit board (active elements such as IC and wiring terminals on the circuit board) are electrically connected by wire bonding, flip-chipping, or the like.

The mechanical quantity sensor 100 is capable of measuring one of or both of an acceleration $\alpha$ and an angular velocity $\omega$. That is, a mechanical quantity means one of or both of the acceleration $\alpha$ and the angular velocity $\omega$. The measurement of accelerations $\alpha x$, $\alpha y$, $\alpha z$ is enabled by detecting displacements of a displaceable portion 112 (to be described later) caused by forces FOx, FOy, FOz in X-, Y-, and Z-axis directions. Further, the measurement of angular velocities $\omega x$, $\omega y$ in the X- and Y-axis directions is enabled by detecting displacements of the displaceable portion 112 caused by Coriolis forces Fy, Fx in the Y- and X-axis directions when the displaceable portion 112 is vibrated in the Z-axis direction. In this manner, the mechanical quantity sensor 100 is capable of measuring the three-axial accelerations $\alpha x$, $\alpha y$, $\alpha z$ and the two-axial angular velocities $\omega x$, $\omega y$. This will be described in detail later.

The first structure 110, the joining part 120, the second structure 130, the first base 140, and the second base 150 each have a substantially square outer periphery having sides each with a 5 mm length, for instance, and they have heights of, for example, 20 μm, 2 μm, 675 μm, 500 μm, and 500 μm respectively.

The first structure 110, the joining part 120, and the second structure 130 can be made of silicon, silicon oxide, and silicon respectively, and the mechanical quantity sensor 100 can be manufactured by using a SOI (Silicon On Insulator) substrate having a three-layer structure of silicon/silicon oxide/silicon. As silicon forming the first structure 110 and the second structure 130, it is preferable to use a conductive material which as a whole contains impurities such as boron. As will be describe later, the use of impurity-containing silicon for forming the first structure 110 and the second structure 130 can simplify wiring of the mechanical quantity sensor 100. In this embodiment, impurity-containing silicon is used for the first structure 110 and the second structure 130.

Further, the first base 140 and the second base 150 each can be made of a glass material.

The first structure 110 has a substantially square outer shape and includes a fixed portion 111 (111a to 111c), the displaceable portion 112 (112a to 112e), a connection portion 113 (113a to 113d), and a block upper layer portion 114 (114a to 114j). The first structure 110 can be fabricated in such a manner that openings 114a to 114d and the block upper layer portions 114a to 114j are formed by etching a film of a semiconductor material.

The fixed portion 111 can be divided into the frame portion 111a and the projecting portions 111b, 111c. The frame portion 111a is a frame-shaped substrate whose outer periphery and inner periphery are both in a substantially square shape. The projecting portion 111b is disposed in a corner portion of the inner periphery of the frame portion 111a and is a substantially square substrate projecting toward the displaceable portion 112b (in an X direction of an X-Y plane), and the projecting portion 111c is disposed in a corner portion of the inner periphery of the frame portion 111a and is a substantially square substrate projecting toward the displaceable portion 112d (in a 180° direction when the X direction of the X-Y plane is defined as 0°). The frame portion 111a and the projecting portions 111b, 111c are integrally formed.

The displaceable portion 112 is made up of the displaceable portions 112a to 112e. The displaceable portion 112a is a substrate having a substantially square outer periphery and is disposed near a center of the opening of the fixed portion 111. The displaceable portions 112b to 112e each are a substrate having a substantially square outer periphery and are connected to and surround the displaceable portion 112a from four directions (an X-axis positive direction, an X-axis negative direction, a Y-axis positive direction, and a Y-axis negative direction). The displaceable portions 112a to 112e are joined to later-described weight portions 132a to 132e via the joining part 120 respectively and displace as a unit relative to the fixed portion 111.

An upper surface of the displaceable portion 112a functions as a driving electrode E1 (to be described later). The driving electrode E1 being the upper surface of the displaceable portion 112a is capacitively coupled to a later-described driving electrode 144a provided on a lower surface of the first base 140 and by a voltage applied therebetween, the displaceable portion 112 is vibrated in the Z-axis direction. This driving will be described in detail later.

Each of upper surfaces of the displaceable portions 112b to 112e functions as a detection electrode E1 (to be described later) detecting the displacements in the X-axis and Y-axis directions of the displaceable portion 112. The detection electrodes being the upper surfaces of the displaceable portions 112b to 112e are capacitively coupled to later-described detection electrodes 144b to 144e provided on the lower surface of the first base 140 respectively (the alphabets b to e of the displaceable portions 112 correspond to the alphabets b to e of the detection electrodes 144 in order respectively). This detection will be described in detail later.

The connection portions 113a to 113d are substantially rectangular substrates and connect the fixed portion 111 and the displaceable portion 112a in four directions (directions of 45°, 135°, 225°, and 315° when the X direction of the X-Y plane is defined as 0°).

Areas, of the connection portions 113a to 113d, near the frame portion 111a are joined to projecting portions 131c (to be described later) of a pedestal 131 via the joining part 120. In other areas of the connection portions 113a to 113d, that is, in areas near the displaceable portion 112a, no projecting portion 131c is formed in corresponding areas, and these areas have a small thickness and thus have flexibility. The reason why the areas, of the connection portions 113a to 113d, near the frame portion 111a is joined to the projecting portions 131c is to prevent the connection portions 113a to 113d from being damaged due to large bending.

The connection portions 113a to 113d function as bendable beams. Since the connection portions 113a to 113d bend, the displaceable portion 112 is displaceable relative to the fixed portion 111. Concretely, the displaceable portion 112 linearly displaces in the Z positive direction and the Z negative direction relative to the fixed portion 111. Further, the displaceable portion 112 is capable of positive and negative rotations with the X axis and the Y axis as rotation axes, relative to the fixed portion 111. That is, the "displacement" here can include the movement and the rotation (the movement in the Z-axis direction and the rotations around the X and Y axes).

The block upper layer portion 114 is made up of block upper layer portions 114a to 114j. The block upper layer portions 114a to 114j are substantially square substrates and are arranged along an inner periphery of the fixed portion 111 to surround the periphery of the displaceable portion 112.

The block upper layer portions 114h, 114a have end surfaces facing end surfaces of the displaceable portion 112e, the block upper layer portions 114b, 114c have end surfaces facing end surfaces of the displaceable portion 112b, the block upper layer portions 114d, 114e have end surfaces facing end surfaces of the displaceable portion 112c, and the block upper layer portions 114f, 114g have end surfaces facing end surfaces of the displaceable portion 112d. As shown in FIG. 1, the block upper layer portions 114a to 114h each have the end surface facing one of the eight end surfaces of the displaceable portion 112 and are arranged clockwise in alphabetical order. The block upper layer portion 114i and the block upper layer portion 114j are arranged in directions of 90° and 270° respectively when the X direction of the X-Y plane is defined as 0°.

The block upper layer portions 114a to 114h are joined to later-described block lower layer portions 134a to 134h respectively via the joining part 120 (the alphabets a to h of the block upper layer portion 114 correspond to the alphabets a to h of the block lower layer portion 134 in order respectively. Blocks made by joining the block upper layer portions 114a to 114h and the block lower layer portions 134a to 134h respectively are used as wirings for supplying power to later-described detection electrodes 144b to 144e, 154b to 154e.

The block upper layer portions 114i, 114j are joined to later-described block lower layer portions 134i, 134j via the joining part 120. Blocks made by joining the block upper layer portions 114i, 114j and the block lower layer portions 134i, 134j respectively are used as wirings for vibrating the displaceable portion 112 in the Z-axis direction. This will be described in detail later.

The second structure 130 has a substantially square outer shape and includes the pedestal 131 (131a to 131d), the weight portion 132 (132a to 132e), and the block lower layer portion 134 (134a to 134j). The second structure 130 can be fabricated in such a manner that an opening 133, the block lower layer portions 134a to 134j, and a pocket 135 (to be described later) are formed by etching a substrate of a semiconductor material. The pedestal 131 and the block lower layer portions 134a to 134j are substantially equal in height, and the weight portion 132 is lower in height than the pedestal 131 and the block lower layer portions 134a to 134j. This is intended to reserve a gap between the weight portion 132 and the second base 150 to allow the weight portion 132 to displace. The pedestal 131, the block lower layer portions 134a to 134j, and the weight portion 132 are disposed to be apart from one another.

The pedestal 131 can be divided into the frame portion 131a and the projecting portions 131b to 131d. The frame portion 131a is a frame-shaped substrate whose outer periphery and inner periphery are both in a substantially square shape and has a shape corresponding to the frame portion 111a of the fixed portion 111. The projecting portion 131b is disposed in a corner portion of the inner periphery of the frame portion 131a and is a substantially square substrate projecting toward the weight portion 132b (in a 0° direction when the X direction of the X-Y plane is defined as 0°) and has a shape corresponding to the projecting portion 111b of the fixed portion 111.

The projecting portions 131c are four substantially rectangular substrates, which project from the frame portion 131a toward the weight portion 132a in directions of 45°, 135°, 225°, and 315° respectively when the X direction of the X-Y plane is defined as 0°), and have one-side ends connected to the frame portion 131a of the pedestal 131 and the other ends apart from the weight portion 132a. The projecting portions 131c are formed in substantially half areas on the frame portion 131a side, in areas corresponding to the connection portions 113a to 113d, and are not formed in the other areas, that is, in substantially half areas on the weight portion 132 side.

The projecting portion 131d is disposed in a corner portion of the inner periphery of the frame portion 131a, and is a substantially square substrate projecting toward the weight portion 132d (in a 180° direction when the X direction of the X-Y plane is defined as 0°), with the pocket 135 (opening) being formed so as to pass through a front surface and a rear surface of the substrate, and is joined to the projecting portion 111c of the fixed portion 111.

The pocket 135 is, for example, a rectangular parallelepiped space where a getter material for maintaining high vacuum is disposed. One opening end of the pocket 135 is covered by the joining part 120. The other opening end of the pocket 135 is mostly covered by the second base 150, but part thereof near the weight portion 132 is not covered, and this other opening end and the opening 133 where the weight portion 132 and so on are formed partly communicate with each other (not shown).

The getter material adsorbs residual gas in order to enhance the degree of vacuum in the vacuum-sealed mechanical quantity sensor 100. This can reduce an influence by air resistance when the displaceable portion 112 (the weight portion 132 as well) vibrates. As the getter material used in the mechanical quantity sensor 100, usable is, for example, a mixture of titanium and a Zr—V—Fe alloy (manufactured by SAES Getters Japan, product name: Non-evaporable Getter St122, activatable in a temperature range of 300 to 500° C.).

In this specification, the activation of the getter material means that molecules (including gas molecules to be adsorbed) adhering to a surface of the getter material diffuse inside and a new surface having a gas adsorbing power is produced. Further, the activation temperature means a temperature at which the new surface having such a gas molecule adsorbing power is produced.

The frame portion 131a and the projecting portions 131b to 131d are integrally formed. The pedestal 131 is connected to the fixed portion 111 and predetermined areas of the connection portions 113a to 113d via the joining part 120.

The weight portion 132 functions as a heavy weight or an operated body having a mass and receiving the force FO and the Coriolis force F caused by the acceleration α and the angular velocity ω respectively. That is, when the acceleration α and the angular velocity ω are applied, the force FO and the Coriolis force F act on the center of gravity of the weight portion 132.

The weight portion 132 is divided into the weight portions 132a to 132e in a substantially rectangular parallelepiped shape. The weight portions 132b to 132e are connected to the center weight portion 132a from the four directions and are displaceable (movable, rotatable) as a unit. That is, the weight portion 132a functions as a connection portion connecting the weight portions 132b to 132e.

The weight portions 132a to 132e each have a substantially square cross section corresponding to those of the displaceable portions 112a to 112e and are joined to the displaceable portions 112a to 112e via the joining part 120. The displaceable portion 112 displaces according to the force FO and the Coriolis force F applied to the weight portion 132 and as a result, the acceleration α and the angular velocity ω can be measured.

The reason why the weight portion 132 is composed of the weight portions 132a to 132e is to realize both the downsizing and improved sensitivity of the mechanical quantity sensor 100. Downsizing the mechanical quantity sensor 100 (reducing its capacity) results in a reduction in capacity of the weight portion 132 and a reduction in its mass, leading to deteriorated sensitivity to the angular velocity. By arranging the weight portions 132b to 132e in a distributed manner so as not to inhibit the bending of the connection portions 113a to 113d, the weight portion 132 can have a sufficient mass. As a result, the downsizing and improved sensitivity of the mechanical quantity sensor 100 can be both realized.

A rear surface of the weight portion 132a functions as a driving electrode E1 (to be described later). The driving electrode E1 being the rear surface of the weight portion 132a is capacitively coupled to a later-described driving electrode 154a provided on an upper surface of the second base 150, and by a voltage applied therebetween, the displaceable portion 112 is vibrated in the Z-axis direction. This driving will be described in detail later.

Rear surfaces of the weight portions 132b to 132e function as detection electrodes E1 (to be described later) detecting the displacements of the displaceable portion 112 in the X-axis and Y-axis directions. The detection electrodes E1 being the rear surfaces of the weight portions 132b to 132e are capacitively coupled to later-described detection electrodes 154b to 154e provided on the upper surface of the second base 150 respectively (the alphabets b to e of the weight portion 132 correspond to the alphabets b to e of the detection electrode 154 in order respectively). This detection will be described in detail later.

The block lower layer portions 134a to 134j have substantially square cross sections corresponding to those of the block upper layer portions 114a to 114j respectively and are joined to the block upper layer portions 114a to 114j via the joining part 120. The blocks made by joining the block upper layer portions 114a to 114h and the block lower layer portions 134a to 134h will be hereinafter referred to as "blocks a to h" respectively. The blocks a to h are used as the wirings for supplying power to the detection electrodes 144b to 144e, 154b to 154e respectively. The blocks made by joining the block upper layer portions 114i, 114j and the block lower layer portions 134i, 134j (hereinafter, referred to as "blocks i, j" respectively) are used as the wirings for vibrating the displaceable portion 112 in the Z-axis direction. This will be described in detail later.

The joining part 120 connects the first and second structures 110, 130 as previously described. The joining part 120 is divided into a joining part 121 connecting the predetermined areas of the connection portion 113 and the fixed portion 111 to the pedestal 131, a joining part 122 (122a to 122e) connecting the displaceable portions 112a to 112e to the weight portions 132a to 133e, and a joining part 123 (123a to 123j) connecting the block upper layer portions 114a to 114j to the block lower layer portions 134a to 134j. The joining part 120 does not connect the other portions of the first and second structures 110, 130. This is intended to allow the connection portions 113a to 113d to bend and allow the weight portion 132 to displace. It is possible to form the joining parts 121, 122, 123 by etching a silicon oxide film.

Conduction portions 160 to 162 are formed in order to bring the first structure 110 and the second structure 130 into electrical continuity at necessary portions.

The conduction portion 160 brings the fixed portion 111 and the pedestal 131 into electrical continuity and passes through the projecting portion 111b of the fixed portion 111 and the joining part 121.

The conduction portion 161 brings the displaceable portion 112 and the weight portion 132 into electrical continuity and passes through the displaceable portion 112a and the joining part 122.

The conduction portions 162 bring the block upper layer portions 114a, 114b, 114e, 114f, 114i and the block lower layer portions 134a, 134b, 134e, 134f, 134i into electrical continuity respectively and pass through the block upper layer portions 114a, 114b, 114e, 114f, 114i and the joining part 123 respectively.

For example, the conduction portions 160 to 162 are each made up of a through hole and a layer of metal such as, for example, Al formed on an edge, a wall surface, and a bottom of the through hole. The shape of the through holes is not specifically limited, but the through holes of the conduction portions 160 to 162 are preferably in a conical shape fanning out upward since the metal layers can be effectively formed on the through holes in such a shape by sputtering or the like of Al or the like.

The first base 140 is made of, for example, a glass material, has a substantially rectangular parallelepiped outer shape, and has a frame portion 141 and a bottom plate portion 142. It is possible to fabricate the frame portion 141 and the bottom plate portion 142 by forming a substantially rectangular parallelepiped recessed portion 143 (for example, 2.5 mm square and 5 μm depth) in a substrate.

The frame portion 141 is a frame-shaped substrate whose outer periphery and inner periphery are both substantially square. The outer periphery of the frame portion 141 matches the outer periphery of the fixed portion 111, and the inner periphery of the frame portion 141 is smaller than the inner periphery of the fixed portion 111. The bottom plate portion 142 has a substrate shape whose outer periphery is in a substantially square shape which is the same as that of the frame portion 141. The reason why the recessed portion 143 is formed in the first base 140 is to reserve a space where the displaceable portion 112 displaces. The first structure 110 except the displaceable portion 112, that is, the fixed portion 111 and the block upper layer portions 114a to 114j are joined to the first base 140 by, for example, anodic bonding.

The driving electrode 144a and the detection electrodes 144b to 144e are disposed on the bottom plate portion 142 (on a rear surface of the first base 140) so as to face the displaceable portion 112. The driving electrode 144a and the detection electrodes 144b to 144e can all be made of a conductive material. The driving electrode 144a is, for example, in a cross shape and is formed near the center of the recessed portion 143 so as to face the displaceable portion 112a. The detection electrodes 144b to 144e are each in a substantially square shape, surround the driving electrode 144a from the four directions (the X-axis positive direction, the X-axis negative direction, the Y-axis positive direction, and the Y-axis negative direction), and are disposed to face the displaceable portions 112b to 112e in order respectively. The driving electrode 144a and the detection electrodes 144b to 144e are apart from one another.

A wiring layer L1 electrically connected to an upper surface of the block upper layer portion 114i is connected to the driving electrode 144a. A wiring layer L4 electrically connected to an upper surface of the block upper layer portion 114b is connected to the detection electrode 144b, a wiring layer L5 electrically connected to an upper surface of the block upper layer portion 114e is connected to the detection electrode 144c, a wiring layer L6 electrically connected to an upper surface of the block upper layer portion 114f is connected to the detection electrode 144d, and a wiring layer L7 electrically connected to an upper surface of the block upper layer portion 114a is connected to the detection electrode 144e.

As a material forming the driving electrode 144a, the detection electrodes 144b to 144e, and the wiring layers L1, L4 to L7, Nd-containing Al is usable, for instance.

The use of Nd-containing Al for the driving electrode 144a, the detection electrodes 144b to 144e, and so on makes it possible to prevent hillocks from being generated in the driving electrode 144a, the detection electrodes 144b to 144e, and so on during later-described heat treatment processes (the anodic bonding of the first base 140 or the second base 150, the activation of the getter material). The hillocks here are, for example, semispherical protuberances. Consequently, dimension precision of a distance between the driving electrode 144a and the driving electrode E1 (capacitively coupled to the driving electrode 144a) formed on the upper surface of the displaceable portion 112a and distances between the detection electrodes 144b to 144e and the detection electrodes E1 (capacitively coupled to the detection electrodes 144b to 144e in order respectively) formed on the upper surfaces of the displaceable portions 112b to 122e respectively can be enhanced. The dimension precision between the driving electrodes 144a and E1 and between the detection electrodes 144b to 144e and E1 can be thus enhanced, which as a result can reduce variation in capacitance value and reduce variation in characteristic among products.

Further, owing to the prevention of the generation of hillocks in the driving electrode 144a and the detection electrodes 144b to 144e, it is possible to prevent the driving electrode 144a and the driving electrode E1, or the detection electrodes 144b to 144e and the detection electrodes E1, which are to be capacitively coupled, from coming into contact with each other to be short-circuited. This is because it is possible to prevent the driving electrode 144a and the driving electrode E1, or the detection electrodes 144b to 144e and the detection electrodes E1, which are to be capacitively coupled, from coming into contact with each other via the hillocks when the displaceable portion 112 (the weight portion 132 as well) is vibrated in the Z-axis direction by the driving electrodes 144a, 154a.

Further, the use of Nd-containing Al as the material forming the wiring layers L1, L4 to L7 makes it possible to firmly join the first base 140 and the first structure 110. End portions of the wiring layers L1, L4 to L7 (end portions on a side not joined to the driving electrode 144a and the detection electrodes 144b to 144e) are sandwiched between the lower surface of the first base 140 and the upper surfaces of the block upper layer portions 114i, 114b, 114e, 114f, 114a in order respectively. Nd-containing Al is relatively flexible and thus is easily crushed flat. Therefore, at the time of the anodic bonding of the first base 140 and the first structure 110, the end portions of the wiring layers L1, L4 to L7 are easily crushed flat and do not obstruct the anodic bonding.

Further, being made of the same material (Nd-containing Al), the driving electrode 144a, the detection electrodes 144b to 144e, and the wiring layers L1, L4 to L7 can be formed simultaneously by single patterning, which can simplify manufacturing processes.

The second base 150 is made of, for example, a glass material and has a substantially square substrate shape. Portions of the second structure 130 excluding the weight portion 132, that is, the pedestal 131 and the block lower layer portions 134a to 134j, are joined to the second base 150 by, for example, anodic bonding. The weight portion 132 is lower in height than the pedestal 131 and the block lower layer portions 134a to 134j and thus is not joined to the second base 150. This is intended to reserve a gap between the weight portion 132 and the second base 150 and allow the weight portion 132 to displace.

On the upper surface of the second base 150, the driving electrode 154a and the detection electrodes 154b to 154e are disposed so as to face the weight portion 132. The driving electrode 154a and the detection electrodes 154b to 154e can all be made of a conductive material. The driving electrode 154a is in, for example, a cross shape and is formed near the center of the upper surface of the second base 150 so as to face the weight portion 132a. The detection electrodes 154b to 154e are each in a substantially square shape, surround the driving electrode 154a from the four directions (the X-axis positive direction, the X-axis negative direction, the Y-axis positive direction, and the Y-axis negative direction), and are disposed to face the weight portions 132b to 132e respectively. The driving electrode 154a and the detection electrodes 154b to 154e are apart from one another.

A wiring layer L2 electrically connected to a rear surface of the block lower layer portion 134j is connected to the driving electrode 154a. A wiring layer L8 electrically connected to a rear surface of the block lower layer portion 134c is connected to the detection electrode 154b, a wiring layer L9 electrically connected to a rear surface of the block lower layer portion 134d is connected to the detection electrode 154c, a wiring layer L10 electrically connected to a rear surface of the block lower layer portion 134g is connected to the detection electrode 154d, and a wiring layer L11 electrically connected to a rear surface of the block lower layer portion 134h is connected to the detection electrode 154e.

As a material forming the driving electrode 154a, the detection electrodes 154b to 154e, and the wiring layers L2, L8 to L11, Nd-containing Al is usable, for instance.

The use of Nd-containing Al for the driving electrode 154a and the detection electrodes 154b to 154e makes it possible to prevent hillocks from being generated in the driving electrode 154a, the detection electrodes 154b to 154e, and so on during later-described heat treatment processes (the anodic bonding of the second base 150, the activation of the getter material). Consequently, dimension precision of a distance between the driving electrode 154a and the driving electrode E1 (capacitively coupled to the driving electrode 154a) formed on the lower surface of the weight portion 132a and distances between the detection electrodes 154b to 154e and the detection electrodes E1 (capacitively coupled to the detection electrodes 154b to 154e in order respectively) formed on the upper surfaces of the weight portions 132b to 132e respectively can be enhanced. The dimension precision between the driving electrodes 154a and E1 and between the detection electrodes 154b to 154e and E1 can be thus enhanced, which as a result can reduce variation in capacitance value and reduce variation in characteristic among products.

Further, owing to the prevention of the generation of hillocks in the driving electrode 154a and the detection electrodes 154b to 154e, it is possible to prevent the driving electrode 154a and the driving electrode E1, or the detection electrodes 154b to 154e and the detection electrodes E1, which are to be capacitively coupled, from coming into contact with each other to be short-circuited. This is because it is possible to prevent the driving electrode 154a and the driving electrode E1, or the detection electrodes 154b to 154e and the detection electrodes E1, which are to be capacitively coupled, from coming into contact with each other via the hillocks when the displaceable portion 112 (the weight portion 132 as well) is vibrated in the Z-axis direction by the driving electrodes 144a, 154a.

Further, the use of Nd-containing Al as the material forming the wiring layers L2, L8 to L11 makes it possible to firmly join the second base 150 and the second structure 130. End portions of the wiring layers L2, L8 to L11 (end portions on a side not joined to the driving electrode 154a and the detection electrodes 154b to 154e) are sandwiched between the upper surface of the second base 150 and lower surfaces of the block upper layer portions 134j, 134c, 134d, 134g, 134h in order respectively. Nd-containing Al is relatively flexible and thus is easily crushed flat. Therefore, at the time of the anodic bonding of the second base 150 and the second structure 130, the end portions of the wiring layers L2, L8 to L11 are easily crushed flat and thus do not obstruct the anodic bonding.

Further, being made of the same material (Nd-containing Al), the driving electrode 154a, the detection electrodes 154b to 154e, and the wiring layers L2, L8 to L11 can be formed simultaneously by single patterning, which can simplify manufacturing processes.

A wiring terminal T (T1 to T11) passing through the second base 150 is provided in the second base 150 enable electrical connection to the driving electrodes 144a, 154a, the detection electrodes 144b to 144e, 154b to 154e from an external part of the mechanical quantity sensor 100.

An upper end of the wiring terminal T1 is connected to a rear surface of the projecting portion 131b of the pedestal 131. The wiring terminals T2 to T9 are connected to rear surfaces of the block lower layer portions 134a to 134h respectively (the numerical order of T2 to T9 of the wiring terminals T2 to T9 corresponds to the alphabetical order of 134a to 134h of the block lower layer portions 134a to 134h respectively). The wiring terminals T10, T11 are connected to rear surfaces of the block lower layer portions 134i, 134j respectively.

As shown in FIG. 9 and FIG. 10, the wiring terminal T is made up of, for example, a conical through hole fanning out upward and a film of metal such as, for example, Al formed on an edge, a wall surface, and a bottom of the conical through hole, and has the same structure as that of the conduction portions 160 to 162. The wiring terminal T is usable as a connection terminal which is connected to an external circuit by, for example, wire bonding.

Note that in FIG. 1 to FIG. 10, the second base 150 is shown on a lower side in consideration of easier view of the first structure 110, the joining part 120, and the second structure 130. When the wiring terminal T and the external circuit are connected by, for example, wire bonding, setting the second base 150 of the mechanical quantity sensor 100 on an upper side, for example, can facilitate the connection.

(Operation and Wiring of Mechanical Quantity Sensor 100)

The wiring and electrodes of the mechanical quantity sensor 100 will be described.

Figure 11:
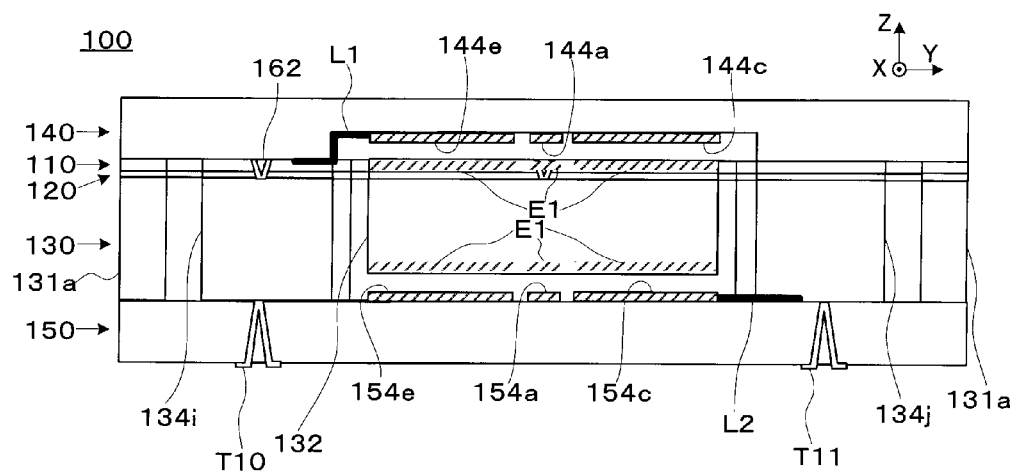
FIG. 11 is a cross-sectional view showing six pairs of capacitor elements in the mechanical quantity sensor shown in FIG. 9.

FIG. 11 is a cross-sectional view showing six pairs of capacitor elements in the mechanical quantity sensor 100 shown in FIG. 9. In FIG. 11, portions functioning as electrodes are hatched. Though FIG. 11 shows the six pairs of capacitor elements, the ten pairs of capacitor elements are formed in the mechanical quantity sensor 100 as previously described.

Electrodes as one-side mates of the ten pairs of capacitor elements are the driving electrode 144a and the detection electrodes 144b to 144e, which are formed on the first base 140, and the driving electrode 154a and the detection electrodes 154b to 154e, which are formed on the second base 150.

The other mates of the ten pairs of capacitor elements are the driving electrode E1 being the upper surface of the displaceable portion 112a, the detection electrodes E1 formed on the upper surfaces of the displaceable portions 112b to 112e respectively, the driving electrode E1 being the lower surface of the weight portion 132a, and the detection electrodes E1 formed on the lower surfaces of the weight portions 132b to 132e respectively. That is, the block made by joining the displaceable portion 112 and the weight portion 132 functions as a common electrode of the ten pairs of capacitive couplings. Since the first structure 110 and the second structure 130 are made of the conductive material (impurity-containing silicon), the block made by joining the displaceable portion 112 and the weight portion 132 can function as an electrode.

The capacitance of a capacitor is inversely proportional to the distance between its electrodes, and therefore it is assumed that the driving electrodes E1 and the detection electrodes E1 are on the upper surface of the displaceable portion 112 and the lower surface of the weight portion 132. That is, the driving electrodes E1 and the detection electrodes E1 are not formed as separate bodies on outer layers of the upper surface of the displaceable portion 112 and the lower surface of the weight portion 132. It is understood that the upper surface of the displaceable portion 112 and the lower surface of the weight portion 132 function as the driving electrodes E1 and the detection electrodes E1.

The driving electrode 144a and the detection electrodes 144b to 144e formed on the first base 140 are electrically connected to the block upper layer portions 114i, 114b, 114e, 114f, 114a via the wiring layers L1, L4 to L7 in order respectively. Further, the block upper layer portions 114i, 114b, 114e, 114f, 114a and the block lower layer portions 134i, 134b, 134e, 134f, 134a are in electrical continuity with each other respectively via the conduction portion 162.

The driving electrode 154a and the detection electrodes 154b to 154e formed on the second base 150 are electrically connected to the block lower layer portions 134j, 134c, 134d, 134g, 134h via the wiring layers L2, L8 to L11 in order respectively.

Therefore, wirings for these driving electrodes 144a, 154a and detection electrodes 144b to 144e, 154b to 154e only have to be connected to the lower surfaces of the block lower layer portions 134a to 134j. The wiring terminals T2 to T9 are disposed on the lower surfaces of the block lower layer portions 134a to 134h respectively, and the wiring terminals T10, T11 are disposed on the lower surfaces of the block lower layer portions 134i, 134j respectively.

With the above structure, the wiring terminals T2 to T11 are electrically connected to the detection electrodes 144e, 144b, 154b, 154c, 144c, 144d, 154d, 154e and the driving electrodes 144a, 154a in order respectively.

The driving electrodes E1 and the detection electrodes E1 are formed by the upper surface of the displaceable portion 112 and the lower surface of the weight portion 132. The displaceable portion 112 and the weight portion 132 are in electrical continuity via the conduction portion 161 and are both made of the conductive material. The pedestal 131 and the fixed portion 111 are in electrical continuity via the conduction portion 160 and are both made of the conductive material. The displaceable portion 112, the connection portion 113, and the fixed portion 111 are integrally formed of the conductive material. Therefore, wirings for the driving electrodes E1 and the detection electrodes E1 only have to be connected to the lower surface of the pedestal 131. The wiring terminal T1 is disposed on the lower surface of the projecting portion 131b of the pedestal 131, and the wiring terminal T1 is electrically connected to the driving electrodes E1 and the detection electrodes E1.

Since the first structure 110 and the second structure 130 are made of the conductive material (impurity-containing silicon) as described above, the blocks a to j made by joining the block upper layer portions 114a to 114j and the block lower layer portions 134a to 134j can have the function as the wirings, which can simplify the wirings to the capacitor elements.

The principle for detecting the acceleration and the angular velocity by the mechanical quantity sensor 100 will be described.

(1) Vibration of Displaceable Portion 112

When the voltage is applied between the driving electrodes 144a and E1, the driving electrodes 144a and E1 are attracted to each other due to a Coulomb force, so that the displaceable portion 112 (the weight portion 132 as well) displaces in the Z-axis positive direction. Further, when the voltage is applied between the driving electrodes 154a and E1, the driving electrodes 154a and E1 are attracted to each other due to a Coulomb force, so that the displaceable portion 112 (the weight portion 132 as well) displaces in the Z-axis negative direction. That is, the alternate voltage application between the driving electrodes 144a and E1 and between the driving electrodes 154a and E1 causes the displaceable portion 112 (the weight portion 132 as well) to vibrate in the Z-axis direction. For this voltage application, a positive or negative DC waveform (a pulse waveform considering the non-application time), a half-wave waveform, or the like is usable.

The driving electrodes 144a and E1 (the upper surface of the displaceable portion 112a), and the driving electrodes 154a and E1 (the lower surface of the weight portion 132a) function as vibration appliers, and the detection electrodes 144b to 144e, 154b to 154e and E1 (the upper surfaces of the displaceable portions 112b to 112e and the lower surfaces of the weight portions 132b to 132e) function as displacement detectors.

A period of the vibration of the displaceable portion 112 is determined by a cycle at which the voltages are switched. This switching cycle is preferably close to some degree to a natural frequency of the displaceable portion 112. The natural frequency of the displaceable portion 112 is determined by elasticity of the connection portion 113, the mass of the weight portion 132, and the like. If the period of the vibration applied to the displaceable portion 112 does not correspond to the natural frequency, energy of the vibration applied to the displaceable portion 112 is diverged, resulting in lower energy efficiency.

Incidentally, an AC voltage with a ½ frequency of the natural frequency of the displaceable portion 112 may be applied either between the driving electrodes 144a and E1 or between the driving electrodes 154a and E1.

(2) Generation of Force Caused by Acceleration

When the acceleration $\alpha$ is applied to the weight portion 132 (the displaceable portion 112), the force FO acts on the weight portion 132. Concretely, according to the accelerations $\alpha x$, $\alpha y$, $\alpha z$ in the X-, Y-, and Z-axis directions respectively, the forces FOx ($=m\cdot\alpha x$), FOy ($=m\cdot\alpha y$), FOz ($=m\cdot\alpha z$) in the X-, Y-, and Z-axis directions act on the weight portion 132 (m is the mass of the weight portion 132). As a result, inclinations in the X and Y directions and the displacement in the Z direction occur in the displaceable portion 112. In this manner, the accelerations $\alpha x$, $\alpha y$, $\alpha z$ cause the inclinations (displacements) in the X, Y, and Z directions in the displaceable portion 112.

(3) Generation of Coriolis Force Caused by Angular Velocity

When the angular velocity $\omega$ is applied while the weight portion 132 (the displaceable portion 112) is moving in the Z-axis direction at a velocity vz, the Coriolis force F acts on the weight portion 132. Concretely, according to the angular velocity $\omega x$ in the X-axis direction and the angular velocity $\omega y$ in the Y-axis direction, the Coriolis force Fy ($=2\cdot m\cdot vz\cdot\omega x$)

in the Y-axis direction and the Coriolis force Fx (=2·m·vz·ωy) in the X-axis direction act on the weight portion 132 (m is the mass of the weight portion 132).

When the Coriolis force Fy caused by the angular velocity ωx in the X-axis direction is applied, the inclination in the Y direction occurs in the displaceable portion 112. In this manner, the Coriolis forces Fy, Fx caused by the angular velocities ωx, ωy cause the inclinations (displacements) in the Y direction and the X direction in the displaceable portion 112.

(4) Detection of Displacement of Displaceable Portion 112

In the above-described manner, the displacement (inclination) of the displaceable portion 112 is caused by the acceleration α and the angular velocity ω. The displacement of the displaceable portion 112 can be detected based on the detection electrodes 144b to 144e, 154b to 154e.

When the force FOz in the Z positive direction is applied to the displaceable portion 112, the distance between the detection electrodes E1 (the upper surface of the displaceable portion 112c) and 144c and the distance between the detection electrodes E1 (the upper surface of the displaceable portion 112e) and 144e both decrease. As a result, the capacitance between the detection electrodes E1 (the upper surface of the displaceable portion 112c) and 114c and the capacitance between the detection electrodes E1 (the upper surface of the displaceable portion 112e) and 144e both increase. That is, based on the sum of the capacitances between the detection electrodes E1 and the detection electrodes 144b to 144e (or the sum of the capacitances between the detection electrodes E1 and the detection electrodes 154b to 154e), it is possible to detect the displacement in the Z direction of the displaceable portion 112 to extract the displacement as a detection signal.

On the other hand, when the force FOy in the Y positive direction or the Coriolis force Fy is applied to the displaceable portion 112, the distance between the driving electrodes E1 (the upper surface of the displaceable portion 112c) and 144c and the distance between the detection electrodes E1 (the lower surface of the weight portion 132e) and 154e decrease, and the distance between the detection electrodes E1 (the upper surface of the displaceable portion 112e) and 144e and the distance between the detection electrodes E1 (the lower surface of the weight portion 132c) and 154c increase. As a result, the capacitance between the detection electrodes E1 (the upper surface of the displaceable portion 112c) and 144c and the capacitance between the detection electrodes E1 (the lower surface of the weight portion 132e) and 154e increase, and the capacitance between the detection electrodes E1 (the upper surface of the displaceable portion 112e) and 144e and the capacitance between the detection electrodes E1 (the lower surface of the weight portion 132c) and 154c decrease. That is, based on a difference in capacitances between the detection electrodes E1 and the detection electrodes 144b to 144e, 154b to 154e, it is possible to detect changes in the inclinations in the X and Y directions of the displaceable portion 112 to extract the changes as detection signals.

In the above-described manner, the inclinations in the X direction and the Y direction and the displacement in the Z direction of the displaceable portion 112 are detected based on the detection electrodes E1, 144b to 144e, 145b to 154e.

(5) Extraction of Acceleration and Angular Velocity from Detection Signals

Signals output from the detection electrodes 144b to 144e, 154b to 154e and E1 contain both of components caused by the accelerations αx, αy, αz and components caused by the angular velocities ωx, ωy. By utilizing differences among these components, the acceleration and the angular velocity can be extracted.

A force Fα (=m·α) when the acceleration α is applied to the weight portion 132 (mass m) is not dependent on the vibration of the weight portion 132. That is, acceleration components in the detection signals are a kind of bias components not responding to the vibration of the weight portion 132. On the other hand, a force Fω (=2·m·vz·ω) when the angular velocity ω is applied to the weight portion 132 (mass m) is dependent on the velocity vz in the Z-axis direction of the weight portion 132. That is, angular velocity components in the detection signals are a kind of amplitude components cyclically changing in response to the vibration of the weight portion 132.

Concretely, the bias components (accelerations) with a lower frequency than the vibration frequency of the displaceable portion 112 and vibration components (angular velocities) with the same frequency as the vibration frequency of the displaceable portion 112 are extracted by frequency analysis of the detection signals. As a result, the mechanical quantity sensor 100 is capable of measuring the accelerations αx, αy, αz in the X, Y, Z directions (three axes) and the angular velocities ωx, ωy in the X and Y directions (two axes).

(Fabrication of Mechanical Quantity Sensor 100)

Figure 12:
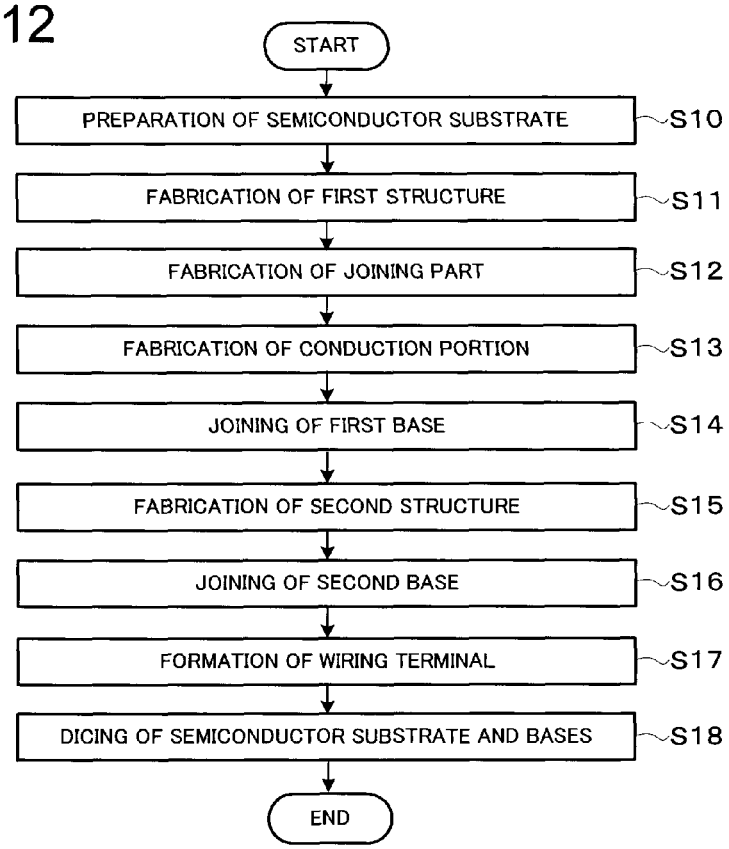
FIG. 12 is a flowchart showing an example of the fabrication procedure of the mechanical quantity sensor according to the first embodiment of the present invention.

A fabrication process of the mechanical quantity sensor 100 will be described. FIG. 12 is a flowchart showing an example of the fabrication procedure of the mechanical quantity sensor 100. Further, FIG. 13A to FIG. 13J are cross-sectional views showing states of the mechanical quantity sensor 100 in the fabrication procedure in FIG. 12 (corresponding to a cross section of the mechanical quantity sensor 100 in FIG. 1 taken along C-C). FIG. 13A to FIG. 13J correspond to cross-sectional views where the mechanical quantity sensor 100 in FIG. 10 is set upside down.

Figure 13A:
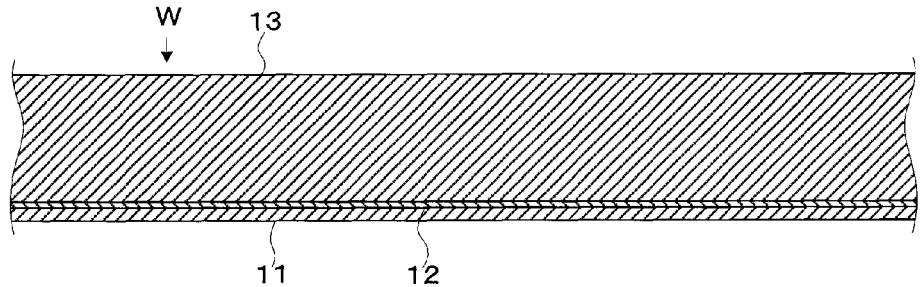
FIG. 13A is a cross-sectional view showing a state of the mechanical quantity sensor in the fabrication procedure in FIG. 12.

(1) Preparation of Semiconductor Substrate W (Step S10 and FIG. 13A)

As shown in FIG. 13A, a semiconductor substrate W made up of three stacked layers, that is, first, second, and third layers 11, 12, 13, is prepared.

The first, second, and third layers 11, 12, 13 are layers for forming the first structure 110, the joining part 120, and the second structure 130 respectively, and here, are layers made of impurity-containing silicon, silicon oxide, and impurity-containing silicon respectively.

The semiconductor substrate W having a stack structure of the three layers of impurity-containing silicon/silicon oxide/ impurity-containing silicon can be fabricated in such a manner that a substrate made up of an impurity-containing silicon substrate with a silicon oxide film stacked thereon and an impurity-containing silicon substrate are joined and thereafter, the latter impurity-containing silicon substrate is thinly polished (what is called a SOI substrate).

Here, the impurity-containing silicon substrate can be manufactured by, for example, doping boron in the manufacture of silicon single crystals by a Czochralski method. An example of the impurities contained in silicon is boron. As boron-containing silicon, usable is, for example, that containing high-concentration boron and having a 0.001 to 0.01 Ω·cm resistivity.

Here, the first layer 11 and the third layer 13 are made of the same material (impurity-containing silicon), but all of the first, second, and third layers 11, 12, 13 may be made of different materials.

Figure 13B:
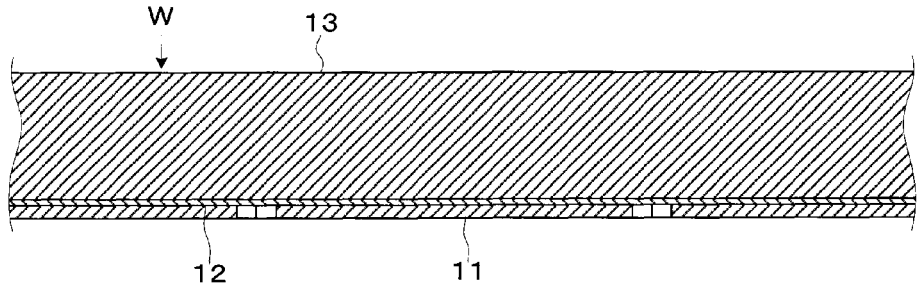
FIG. 13B is a cross-sectional view showing a state of the mechanical quantity sensor in the fabrication procedure in FIG. 12.

(2) Fabrication of First Structure 110 (Etching of First Layer 11, Step S11, and FIG. 13B)

By etching the first layer 11, the opening 115 is formed and the first structure 110 is formed. That is, by using an etching method erosive to the first layer 11 and not erosive to the second layer 12, predetermined areas (the openings 115a to 115d) of the first layer 11 are etched in a thickness direction until an upper surface of the second layer 12 is exposed.

A resist layer having a pattern corresponding to the first structure 110 is formed on an upper surface of the first layer 11 and exposed portions not covered by the resist layer are eroded vertically downward. In this etching process, since the second layer 12 is not eroded, only the predetermined areas (the openings 115a to 115d) of the first layer 11 are removed. FIG. 13B shows a state where the first structure 110 is formed by the aforesaid etching of the first layer 11.

Figure 13C:
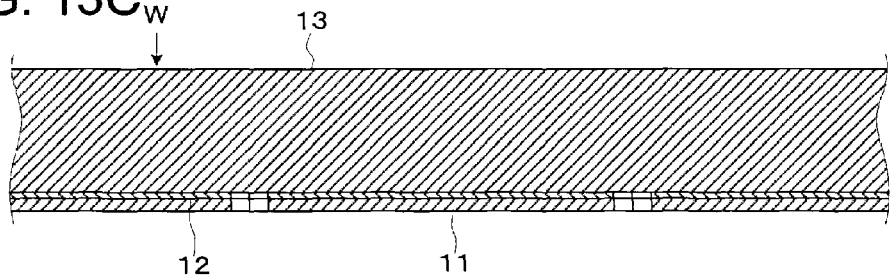
FIG. 13C is a cross-sectional view showing a state of the mechanical quantity sensor in the fabrication procedure in FIG. 12.

(3) Fabrication of Joining Part 120 (Etching of Second Layer 12, Step S12, and FIG. 13C).

The second layer 12 is etched, whereby the joining part 120 is formed. That is, by an etching method erosive to the second layer 12 and erosive neither to the first layer 11 nor to the third layer 13, the second layer 12 is etched from its exposed portions in the thickness direction and the layer direction.

In this etching process, there is no need to form a resist layer separately. That is, the first structure 110 being residual portions of the first layer 11 functions as a resist layer for the second layer 12. The etching is applied to the exposed portions of the second layer 12.

In the etching process of the second layer 12 (Step S12), it is necessary to perform the etching method satisfying the following two conditions. The first condition is to have directivity in the layer direction as well as the thickness direction, and the second condition is to be erosive to a silicon oxide layer but not to be erosive to a silicon layer.

The first condition is a condition necessary to prevent the silicon oxide layer from remaining in unnecessary portions to inhibit the degree of freedom of the displacement of the weight portion 132. The second condition is a condition necessary to prevent the erosion of the silicon first structure 110, which has already been processed to a predetermined shape, and the third layer 13.

A possible etching method satisfying the first and second conditions is a wet etching using buffered hydrofluoric acid (for example, a mixture aqueous solution of HF=5.5 wt % and $NH_4F$=20 wt %) as an etching solution. Also usable is dry etching by a RIE method using mixed gas of $CF_4$ gas and $O_2$ gas.

Figure 13D:
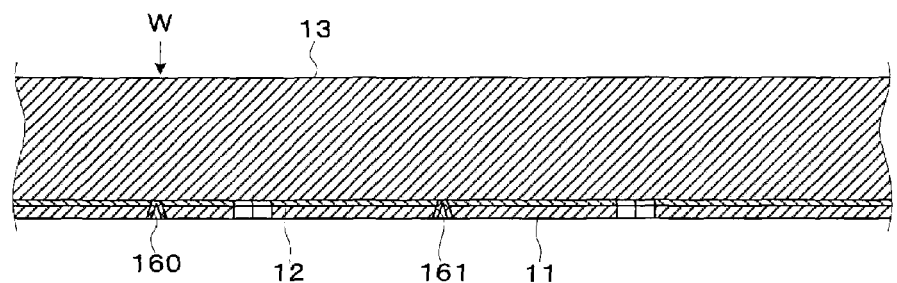
FIG. 13D is a cross-sectional view showing a state of the mechanical quantity sensor in the fabrication procedure in FIG. 12.

(4) Formation of Conduction Portions 160 to 162 (Step S13 and FIG. 13D)

The conduction portions 160 to 162 are formed in the following manners a, b.

a. Formation of Conical Through Holes

By wet-etching of predetermined portions of the first structure 110 and the second layer 12, the conical through holes penetrating up to the second layer 12 are formed. As an etching solution, for example, 20% TMAH (tetramethylammonium hydroxide) is usable in the etching of the first structure 110, and for example, buffered hydrofluoric acid (for example, a mixture aqueous solution of HF=5.5 wt % and $NH_4F$=20 wt %) is usable in the etching of the second layer 12.

b. Formation of Metal Layer

On the upper surface of the first structure 110 and in the conical through holes, for example, Al is deposited by a vapor deposition method, a sputtering method, or the like, whereby the conduction portions 160 to 162 are formed. Unnecessary portions of the metal layer deposited on the upper surface of the first structure 110 (metal layer outside edges (not shown) of upper ends of the conduction portions 160 to 162) are removed by etching.

Figure 13E:
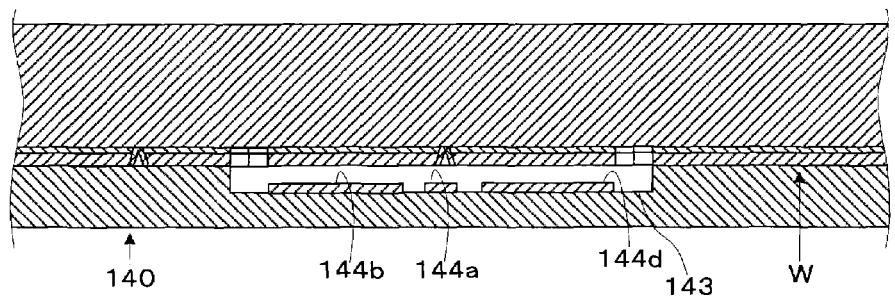
FIG. 13E is a cross-sectional view showing a state of the mechanical quantity sensor in the fabrication procedure in FIG. 12.

(5) Joining of First Base 140 (Step S14 and FIG. 13E)

1) Formation of First Base 140

By etching a substrate made of an insulating material, for example, a glass substrate, the recessed portion 143 is formed, and the driving electrode 144a, the detection electrodes 144b to 144e, and the wiring layers L1, L4 to L7 are formed at predetermined positions by a pattern made of, for example, Nd-containing Al. Being made of the same material (Nd-containing Al), the driving electrode 144a, the detection electrodes 144b to 144e, and the wiring layers L1, L4 to L7 can be formed simultaneously by single patterning, which can simplify the manufacturing processes.

2) Joining of Semiconductor Substrate W and First Base 140

The semiconductor substrate W and the first base 140 are joined by, for example, anodic bonding. Before the second structure 130 is fabricated, the first base 140 is anodically bonded. Since the anodic bonding of the first base 140 precedes the formation of the weight portion 132, the connection portions 113a to 113d have no thin area and do not have flexibility, and therefore, even if electrostatic attraction is generated, the displaceable portion 112 is not attracted to the first base 140. This can prevent the first base 140 and the displaceable portion 112 from being joined. FIG. 13E shows a state where the semiconductor substrate W and the first base 140 are joined.

At the time of the anodic bonding of the first base 140 and the semiconductor substrate W, since they are heated to, for instance, nearly 300° C., hillocks may possibly be generated in the driving electrode 144a, the detection electrodes 144b to 144e, and the wiring layers L1, L4 to L7 (hereinafter, referred to as the "driving electrode 144a and so on"). The use of Nd-containing Al for the driving electrode 144a and so on makes it possible to prevent the generation of hillocks in the driving electrode 144a and so on at the time of the anodic bonding of the first base 140. Consequently, it is possible to enhance dimension precision between the driving electrodes 144a and E1 and between the detection electrodes 144b to 144e and E1, which can as a result reduce variation in capacitance value and thus can reduce variation in characteristic among products.

Further, since the generation of hillocks in the driving electrode 144a and so on can be prevented, it is possible to prevent the driving electrode 144a and the driving electrode E1, or the detection electrodes 144b to 144e and the detection electrodes E1, which are to be capacitively coupled, from coming into contact with each other via the hillocks to be short-circuited when the displaceable portion 122 (the weight portion 132 as well) is vibrated in the Z-axis direction by the driving electrodes 144a, 154a.

Further, as described above, since Nd-containing Al which is relatively flexible and thus is easily crushed flat is used as the material forming the wiring layers L1, L4 to L7, the wiring layers L1, L4 to L7 do not obstruct the anodic bonding, which makes it possible to firmly join the first base 140 and the first structure 110.

Figure 13F:
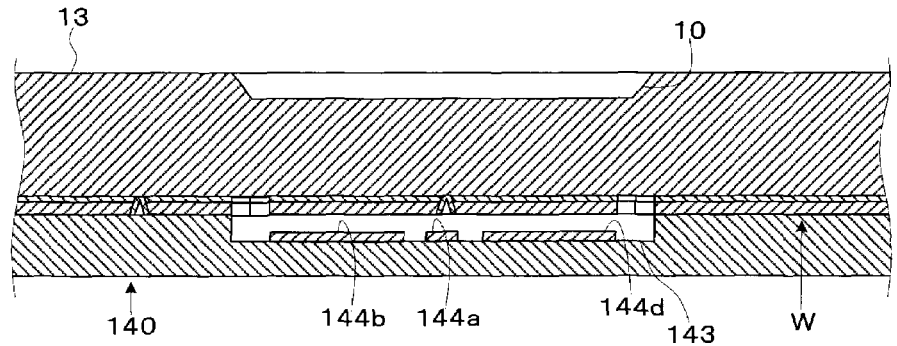
FIG. 13F is a cross-sectional view showing a state of the mechanical quantity sensor in the fabrication procedure in FIG. 12.
Figure 13G:
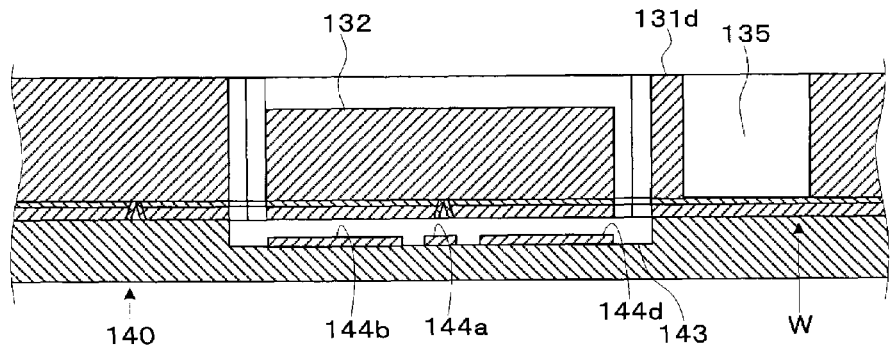
FIG. 13G is a cross-sectional view showing a state of the mechanical quantity sensor in the fabrication procedure in FIG. 12.

(6) Fabrication of Second Structure 130 (Etching of Third Layer 13, Step S15, and FIG. 13F and FIG. 13G)

The second structure 130 is formed in the following manners a, b.

a. Formation of Gap 10 (FIG. 13F)

On an upper surface of the third layer 13 excluding the formation areas of the weight portion 132 and its vicinity, a resist layer is formed, and exposed portions not covered by the resist layer (the formation areas of the weight portion 132 and its vicinity) are eroded vertically downward. As a result, the gap 10 for allowing the displacement of the weight portion 132 is formed on top of the formation area of the weight portion.

b. Formation of Second Structure 130 (FIG. 13G)

The opening 133, the block lower layer portions 134a to 134j, and the pocket 135 are formed by etching the third layer 13 in which the gap 10 is formed, whereby the second structure 130 is formed. That is, by an etching method erosive to the third layer 13 and not erosive to the second layer 12, a predetermined area (the opening 133) of the third layer 13 is etched in the thickness direction.

A resist layer having a pattern corresponding to the second structure 130 is formed on the upper surface of the third layer 13, and exposed portions not covered by the resist layer are eroded vertically downward. FIG. 13G shows a state where the second structure 130 is formed by the aforesaid etching of the third layer 13.

In the above manufacturing processes, an etching method as described below needs to be performed in the process of forming the first structure 110 (Step S11) and the process of forming the second structure 130 (Step S15).

A first condition is to have directivity in the thickness direction of each layer. A second condition is to be erosive to a silicon layer and not to be erosive to a silicon oxide layer.

A possible etching method satisfying the first condition is ICP (Inductively-Coupled Plasma Etching Method). This etching method is an effective method to dig a deep groove in the vertical direction and is a kind of an etching method generally called DRIE (Deep Reactive Ion Etching).

In this method, an etching stage where a material layer is continuously dug while being eroded in the thickness direction and a deposition stage where a polymer wall is formed on a side surface of the dug hole are alternately repeated. The side surface of the dug hole is protected by the sequentially formed polymer walls, which makes it possible to progress the erosion only in the substantially thickness direction.

Etching satisfying the second condition is enabled by the use of etching materials having etching selectivity to silicon oxide and silicon. A possible example is to use mixed gas of $SF_6$ gas and $O_2$ gas in the etching stage and to use $C_4F_8$ gas in the deposition stage.

Figure 13H:
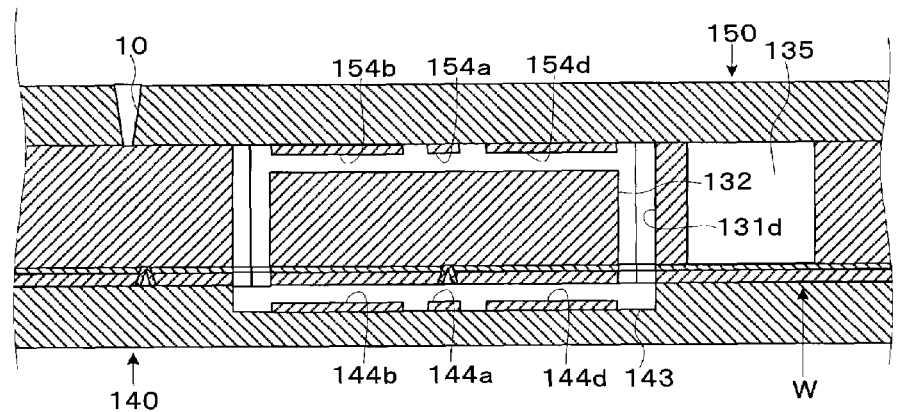
FIG. 13H is a cross-sectional view showing a state of the mechanical quantity sensor in the fabrication procedure in FIG. 12.

(7) Joining of Second Base 150 (Step S16 and FIG. 13H)

1) Fabrication of Second Base 150

On a substrate made of an insulating material, the driving electrode 154a, the detection electrodes 154b to 154e, and the wiring layers L2, L8 to L11 are formed at predetermined positions by using a pattern made of, for example, Nd-containing Al. Further, by etching the second base 150, eleven pieces of the upwardly fanning-out conical through holes 10 for forming the wiring terminals T1 to T11 are formed at predetermined places. Being made of the same material (Nd-containing Al), the driving electrode 154a, the detection electrodes 154b to 154e, and the wiring layers L2, L8 to L11 can be simultaneously formed by single patterning, which can simplify the manufacturing processes.

2) Joining of Semiconductor Substrate W and Second Base 150

The getter material (manufactured by SAES Getters Japan, product name: Non-evaporable Getter St122) is put in the pocket 135, and the second base 150 and the semiconductor substrate W are joined by, for example, anodic bonding. FIG. 13H shows a state where the semiconductor substrate W and the second base 150 are joined.

At the time of the anodic bonding of the second base 150 and the semiconductor substrate W, since they are heated to, for example, nearly 300° C., hillocks may possibly be generated in the driving electrodes 144a, 154a, the detection electrodes 144b to 144e, 154b to 154e, and the wiring layers L1, L2, L4 to L11 (hereinafter, referred to as the "driving electrodes 144a, 154a and so on"). The use of Nd-containing Al for the driving electrodes 144a, 154a and so on makes it possible to prevent the generation of hillocks in the driving electrodes 144a, 154a and so on at the time of the anodic bonding of the second base 150. Consequently, it is possible to enhance dimension precision between the driving electrodes 144a and E1, between the driving electrodes 154a and E1, between the detection electrodes 144b to 144e and E1, and between the detection electrodes 154b to 154e and E1, which can as a result reduce variation in capacitance value and thus can reduce variation in characteristic among products.

Further, since the generation of hillocks in the driving electrodes 144a, 154a and so on can be prevented, it is possible to prevent the driving electrode 144a and the driving electrode E1, the driving electrode 154a and the driving electrode E1, the detection electrodes 144b to 144e and the detection electrodes E1, or the detection electrodes 154b to 154e and the detection electrodes E1, which are to be capacitively coupled, from coming into contact with each other via the hillocks to be short-circuited when the displaceable portion 112 (the weight portion 132 as well) is vibrated in the Z-axis direction by the driving electrodes 144a, 154a.

Further, as described above, since Nd-containing Al which is relatively flexible and thus is easily crushed flat is used as the material forming the wiring layers L2, L8 to L11, the wiring layers L2, L8 to L11 do not obstruct the anodic bonding, which makes it possible to firmly join the second base 150 and the second structure 130.

Figure 13I:
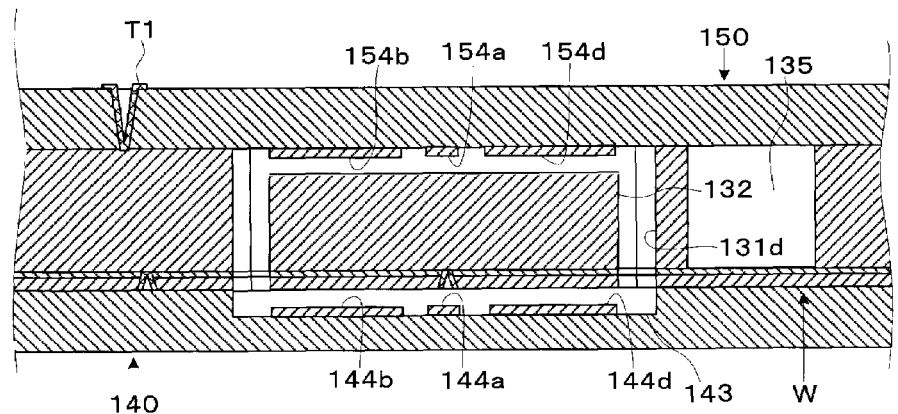
FIG. 13I is a cross-sectional view showing a state of the mechanical quantity sensor in the fabrication procedure in FIG. 12.

(8) Formation of Wiring Terminals T1 to T11 (Step S17 and FIG. 13I)

On the upper surface of the second base 150 and in the conical through holes 10, metal layers, for example, a Cr layer and an Au layer are formed in this order by a vapor deposition method, a sputtering method, or the like. Unnecessary portions of the metal layers (metal layers outsides edges of upper ends of the wiring terminals T) are removed by etching, whereby the wiring terminals T1 to T11 are formed.

Figure 13J:
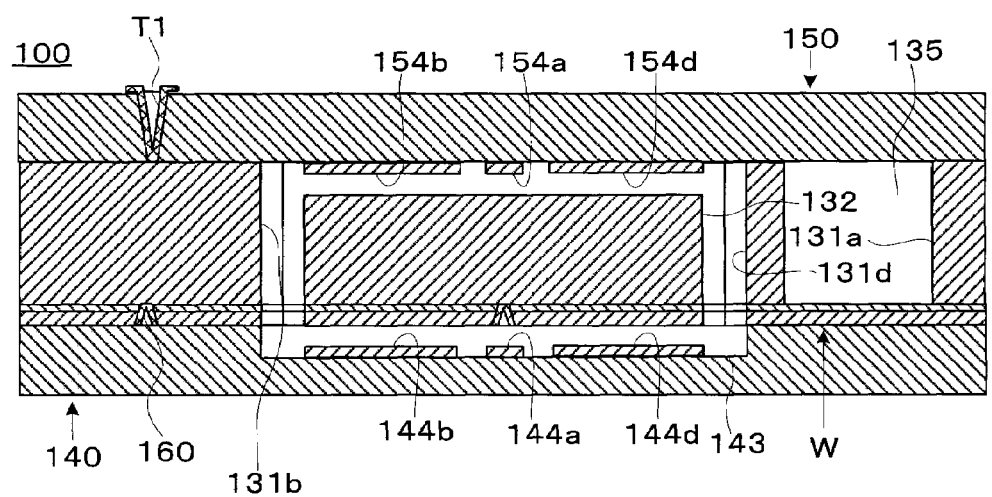
FIG. 13J is a cross-sectional view showing a state of the mechanical quantity sensor in the fabrication procedure in FIG. 12.

(9) Dicing of Semiconductor Substrate W, First Base 140, and Second Base 150 (Step S18 and FIG. 13J)

After the getter material in the pocket 135 is activated by, for example, 400° C. heat treatment, cuts are made in the mutually joined semiconductor substrate W, first base 140, and second base 150 by a dicing saw or the like, whereby they are separated into individual mechanical quantity sensors 100.

During the heat treatment for activating the getter material, hillocks may possibly be generated in the driving electrodes 144a, 154a, the detection electrodes 144b to 144e, 154b to 154e, and the wiring layers L1, L2, L4 to L11 (the driving electrodes 144a, 154a and so on). The generation of hillocks is prevented by the use of Nd-containing Al for the driving electrodes 144a, 154a and so on. Consequently, it is possible to enhance dimension precision between the driving electrodes 144a and E1, between the driving electrodes 154a and E1, between the detection electrodes 144b to 144e and E1, and between the detection electrodes 154b to 154e and E1, which can as a result reduce variation in capacitance value and thus can reduce variation in characteristic among products.

Further, since the generation of hillocks in the driving electrode 144a, 154a and so on can be prevented as described above, it is possible to prevent the driving electrode 144a and the driving electrode E1, the driving electrode 154a and the driving electrode E1, the detection electrodes 144b to 144e and the detection electrodes E1, or the detection electrodes 154b to 154e and the detection electrodes E1, which are to be capacitively coupled, from coming into contact with each other via the hillocks to be short-circuited.

(Details of Prevention of Generation of Hillocks)

Hereinafter, details of the prevention of the generation of hillocks by using Nd-containing Al as the material forming the driving electrodes 144a, 154a, the detection electrodes 144b to 144e, 154b to 154e, and the wiring layers L1, L2, L4 to L11 (the driving electrodes 144a, 154a and so on) will be described. The hillocks mentioned here are, for example, semispherical protuberance formed in the driving electrodes 144a, 154a and so on. When the driving electrodes 144a, 154a and so on are heated, a compressive stress is generated. Due to plastic deformation of the driving electrodes 144a, 154a and so on by the compressive stress, hillocks are generated.

When the material forming the driving electrodes 144a, 154a and so on is pure Al, an internal stress of the driving electrodes 144a, 154a and so on changes from a tensile stress to a compressive stress due to a temperature increase by the heating. When this compressive stress becomes larger than a certain value (a hillock generation stress), the plastic deformation of the driving electrodes 144, 154a and so on is started. Due to the compressive stress, constituent atoms of the driving electrodes 144a, 154a and so on move (what is called creep) to gather, so that hillocks are generated.

The hillock generation stress is temperature-dependent and becomes smaller as the temperature increases. Further, the hillock generation stress is larger than what is called a yield stress. That is, even if the compressive stress exceeds the yield stress, hillocks are not immediately generated.

When the material forming the driving electrodes 144a, 154a and so on is an AlNd alloy, Nd in the driving electrodes 144a, 154a and so on is re-crystallized to separate out when the temperature increases. By this separation, the structure of the driving electrodes 144a, 154a and so on is reconstructed, so that the internal stress in the driving electrodes 144a, 154a and so on is reduced. As a result, the generation of hillocks due to the compressive stress is prevented in the driving electrodes 144a, 154a and so on.

As described above, if Nd is added to Al, Nd is re-crystallized when the temperature increases, and alleviates the internal stress, so that the generation of hillocks in the driving electrodes 144a, 154a and so on is prevented.

An amount of Nd added to Al is preferably 1.5 to 10 at % (atomic percent, atomicity ratio (%)), and more preferably 2 to 3 at %. When the amount of Nd added is small, the internal stress is not sufficiently alleviated, which may possibly cause the generation of hillocks. On the other hand, when the amount of Nd added is large, internal resistance and hardness of the driving electrodes 144a, 154a and so on become large, which is not preferable.

Example

Experimental studies were conducted on the material forming the driving electrodes 144a, 154a and so on and the presence/absence of the generation of hillocks.

Concretely, an Nd-containing Al film was formed on a glass substrate and the presence/absence of the generation of hillocks due to heat treatment was confirmed. As the condition for the heat treatment, the temperature was set to 400° C. and the treatment time was set to one hour. An optical microscope was used to observe the presence/absence of hillocks.

When a content ratio of Nd is 0 at % (pure Al) and 1.3 at %, the generation of hillocks was observed. On the other hand, when the content ratio of Nd is 2.0 at %, the generation of hillocks was not observed. It is inferred from this result that hillocks can be reduced when the content ratio of Nd is about 1.5 at % or higher.

When the content ratio of Nd was set to 2.0 at % and the treatment time was set to 30 minutes under varied temperatures of 200° C., 300° C., 400° C. and 430° C., no generation of hillocks was observed at any of the temperatures.

Incidentally, with about the aforesaid treatment temperature and treatment time (for example, the treatment temperature of 400° C. and the treatment time of one hour or the treatment temperature of 430° C. and the treatment time of 30 minutes) with which no hillock is generated in the Nd-containing Al film, the getter material (for example, manufactured by SAES Getters Japan, product name: Non-evaporable Getter St122) can be activated.

Based on the above findings, an Al film whose Nd content ratio is 2.0 at % was used for the driving electrodes 144a, 154a and so on and the mechanical quantity sensors 100 were fabricated. As a result, when the first base 140 or the second base 150 was joined and when the getter material was activated, it was possible to prevent the generation of hillocks in the driving electrodes 144a, 154a and so on, variation in capacitance value was reduced, and it was possible to reduce variation in characteristic among products. Further, when the driving electrodes 144a, 154a, E1 vibrated the weight portion 132 in the Z direction, it was possible to prevent the driving electrode 144a and the driving electrode E1, the driving electrode 154a and the driving electrode E1, the detection electrodes 144b to 144e and the detection electrodes E1, or the detection electrodes 154b to 154e and the detection electrodes E1, which are to be capacitively coupled, from coming into contact with each other to be short-circuited.

On the other hand, when pure Al was used for the driving electrodes 144a 154a and so on and the mechanical quantity sensors 100 were fabricated, hillocks were generated in the driving electrodes 144a, 154a and so on, and variation in characteristic among products was sometimes larger than when Nd-containing Al was used.

Other Embodiment

An embodiment of the present invention is not limited to the above-described embodiment, and this embodiment can be expanded and modified, and the expanded and modified embodiments are included in the technical scope of the present invention. For example, though the example where the conductive material (impurity-containing silicon) is used for the first structure 110 and the second structure 130 in the mechanical quantity sensor 100 is described, the whole portions thereof are not necessarily made of the conductive material. At least necessary portions such as the driving electrodes E1, the detection electrodes E1, a portion bringing the wiring terminal T10 and the upper surface of the block upper layer portion 114i into electrical continuity, and the like may be made of the conductive material. When the necessary portions such as the driving electrodes E1 and the detection electrodes E1 are thus made of the conductive material, these portions are preferably made of, for example, Nd-containing Al since such a material can prevent the generation of hillocks.

Further, instead of Al—Nd, a material such as Al—Ta, Ti, Cr, or Mo is usable, for instance. That is, an alloy such as AlTa is usable for the driving electrodes 144a, 154a and so on. As previously described, Nd prevents the generation of hillocks in the driving electrodes 144a, 154a and so on by alleviating the internal stress when Nd is re-crystallized at the time of the temperature increase. A material capable of such alleviation of the internal stress is not limited to Nd.

What is claimed is:

1. A method of manufacturing a mechanical quantity sensor, comprising:
   providing a semiconductor substrate, the semiconductor substrate comprising:
      a first layer made of an impurity-containing silicon;
      a second layer made of an insulating material; and
      a third layer made of an impurity-containing silicon;
   forming a first structure by etching the first layer of the semiconductor substrate, the first structure comprises:
      a fixed portion with an opening,
      a block upper layer portion disposed in the opening and having conductivity,
      a displaceable portion disposed in the opening and displaceable relative to the fixed portion, and
      a connection portion connecting the fixed portion and the displaceable portion;
   stacking, on the first structure, a first base by joining the first base to the fixed portion via anodic bonding at a temperature of 300 Celsius degree or higher, wherein:
      the first base comprises a glass material, and
      the first base has a first driving electrode which:
         applies stack-direction vibration to the displaceable portion,
         is disposed on a surface facing the displaceable portion, and
         is made of a conductive material containing Al and Nd;
   forming a second structure by etching the third layer, the second structure comprising:
      a weight portion which is joined to the displaceable portion,
      a pedestal which surrounds the weight portion and is joined to the fixed portion, and
      a block lower layer portion surrounded by the pedestal and having conductivity; and
   stacking, on the second structure, a second base by joining the second base to the pedestal via anodic bonding at a temperature of 300 Celsius degree or higher, wherein:
      the second base comprises a glass material, and
      the second base has a second driving electrode which:
         applies stack-direction vibration to the displaceable portion,
         is disposed on a surface facing the weight portion, and
         is made of the conducive material.

2. The method of manufacturing the mechanical quantity sensor according to claim 1,
   wherein the first base further has a first wiring whose one end is connected to the first driving electrode and which is made of the conductive material;
   wherein the block upper layer portion is connected to the other end of the first wiring;
   wherein the second base further has a second wiring whose one end is connected to the second driving electrode and which is made of the conductive material; and
   wherein the block lower layer portion is connected to the other end of the second wiring.

3. The method of manufacturing the mechanical quantity sensor according to claim 1,
   wherein the first base further has a first detection electrode detecting the displacement of the displaceable portion, disposed on a surface facing the displaceable portion, and made of the conductive material; and
   wherein the second base further has a second detection electrode detecting the displacement of the displaceable portion, disposed on a surface facing the weight portion, and made of the conductive material.

4. The method of manufacturing the mechanical quantity sensor according to claim 3,
   wherein the first base further has a first wiring whose one end is connected to the first detection electrode and which is made of the conductive material;
   wherein the block upper layer portion is connected to the other end of the third wiring;
   wherein the second base further has a second wiring whose one end is connected to the second detection electrode and which is made of the conductive material; and
   wherein the block lower layer portion is connected to the other end of the fourth wiring.

5. The method of manufacturing the mechanical quantity sensor according to claim 1,
   wherein the forming the second structure further includes forming, in the pedestal, a space where a getter material adsorbing residual gas in the mechanical quantity sensor is disposed, the method further comprising:
      disposing the getter material in the space before the stacking the second base on the second structure; and
      activating the getter material disposed in the space by heat treatment after the stacking the second base on the second structure.

* * * * *